(12) United States Patent
Weber et al.

(10) Patent No.: US 7,634,730 B2
(45) Date of Patent: Dec. 15, 2009

(54) TASK HELPERS

(75) Inventors: Brandon G. Weber, Kirkland, WA (US); Charles D. Ellis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 11/014,013

(22) Filed: Dec. 15, 2004

(65) Prior Publication Data

US 2006/0129932 A1    Jun. 15, 2006

(51) Int. Cl.
  *G06F 13/00* (2006.01)
  *G06F 17/00* (2006.01)
(52) U.S. Cl. .................... 715/705; 715/212; 715/221
(58) Field of Classification Search .................. 715/712, 715/708, 705, 809
See application file for complete search history.

(56) References Cited

U.S. PATENT DOCUMENTS

| 5,890,174 | A |   | 3/1999 | Khanna et al. ............. 707/504 |
| 5,949,416 | A | * | 9/1999 | Bush ......................... 715/708 |
| 6,160,926 | A | * | 12/2000 | Dow et al. .................. 382/313 |
| 6,185,587 | B1 | * | 2/2001 | Bernardo et al. ............ 715/513 |
| 7,210,132 | B2 | * | 4/2007 | Rivard et al. ................ 717/138 |
| 2005/0010862 | A1 | * | 1/2005 | Bauchot ..................... 715/504 |

* cited by examiner

*Primary Examiner*—William L Bashore
*Assistant Examiner*—Jordany Núñez
(74) *Attorney, Agent, or Firm*—Merchant & Gould P.C.

(57) ABSTRACT

The present invention provides a set of task-based helpers that automatically generate formulas that complete a task for the user. In one embodiment, the task helpers automatically create a formula from one or more functions that help complete more complicated tasks. The present invention also provides embodiments of user interfaces that help the user select the appropriate task helper and receive the discrete parameters of the formula for the task.

17 Claims, 24 Drawing Sheets

1208

| Descriptive Statistics | |
|---|---|
| Mean | 51 |
| Standard Error | 16.88112 |
| Median | 19 |
| Mode | #N/A |
| Standard Deviation | 50.64336 |
| Sample Variance | 2564.75 |
| Kurtosis | -1.32622 |
| Skewness | 0.599963 |
| Range | 135 |
| Minimum | 3 |
| Maximum | 138 |
| Sum | 459 |
| Count | 9 |

| Descriptive Statistics | |
|---|---|
| Mean | =AVERAGE(range) |
| Standard Error | =STDEV(range)/SQRT(COUNT(range)) |
| Median | =MEDIAN(range) |
| Mode | =MODE(range) |
| Standard Deviation | =STDEV(range) |
| Sample Variance | =VAR(range) |
| Kurtosis | =KURT(range) |
| Skewness | =SKEW(range) |
| Range | =MAX(range) - MIN(range) |
| Minimum | =MIN(range) |
| Maximum | =MAX(range) |
| Sum | =SUM(range) |
| Count | =COUNT(range) |

Fig. 12C

Figure 13:
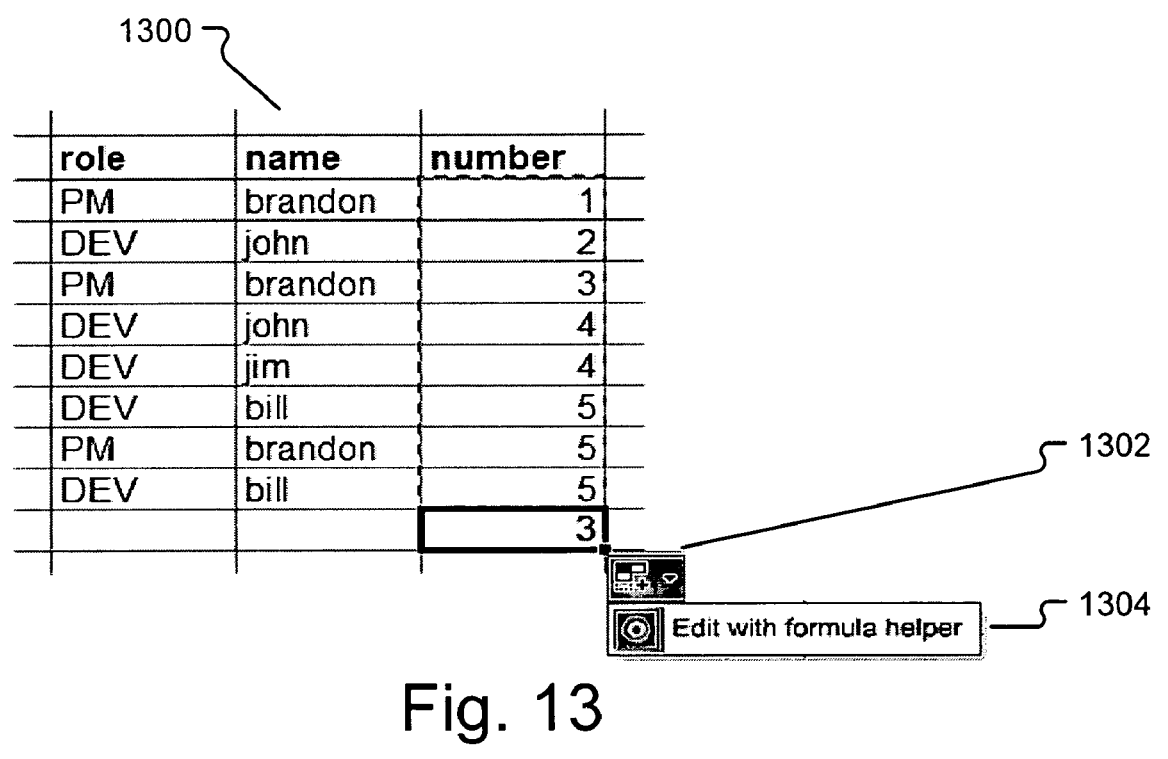

| role | name | number |
|------|------|--------|
| PM | brandon | 1 |
| DEV | john | 2 |
| PM | brandon | 3 |
| DEV | john | 4 |
| DEV | jim | 4 |
| DEV | bill | 5 |
| PM | brandon | 5 |
| DEV | bill | 5 |
| | | 3 |

Edit with formula helper

TASK HELPERS

TECHNICAL FIELD

The present invention relates generally to the field of spreadsheet software or data applications. More particularly, the invention relates to functions and formulas created within spreadsheets.

BACKGROUND OF THE INVENTION

Spreadsheet software or applications are relatively well-known and useful tools. Typical spreadsheet applications simulate physical spreadsheets by capturing, displaying, and manipulating data arranged in rows and columns. The intersecting rows and columns create numerous cells within the spreadsheet. Typically, each cell may contain an item of data and/or a mathematical formula.

Formulas are powerful tools in spreadsheet applications that allow users to generate information from the data. The formulas allow the user to make calculations based on data in other cells or change the data in other cells. Users often create formulas using a certain syntax recognized by the spreadsheet application. Upon entering a correct syntax for a formula, the spreadsheet may display the result of the formula within the spreadsheet. In some instances, the spreadsheet may display the formula.

Generally, users can create formulas in two ways. First, the user manually inputs an expression, with a keyboard or similar user interface device, into the spreadsheet in an application-recognizable syntax. Unfortunately, the formulaic expressions are often difficult to input manually because the formula syntax is hard to learn and often nonsensical to the user, similar to learning or using a foreign language. In addition, the formulaic expressions often require multiple parameters or arguments for each formula. The parameters help the spreadsheet application understand what the formula must accomplish. An error inputting a parameter either creates a formula that does not execute or a formula that executes incorrectly. Also, a more complicated task may require nested functions within a single formula with each function requiring multiple parameters. Long, nested formulas only exacerbate the problems because the longer and more complicated formulas provide even more opportunity for errors.

A second method for entering formulas involves function wizards. While the function wizards try to help the even less sophisticated users of the spreadsheet application, the wizards create new problems. First, the typical wizards generally provide a series of functions from which the user chooses. The list generally comprises mathematical titles, abbreviated titles, or some other title for the available functions. The titles tend to be difficult to understand for the typical user. In a specific example, to calculate the number of payments in a loan, a user using the Microsoft® Excel spreadsheet application would have to select the function named "NPMT." As the example demonstrates, the function lists generally do not display English names or descriptions that the user can easily recognize or that a user knows will provide the correct function for their task. Knowing which formula to select becomes a difficult task because the user often needs to search for the function they want by scrolling through numerous function titles provided in the function wizard. Then, the user must read a description provided to the user in the dialog once the user highlights the function title.

In addition, the function wizard provides a complicated user interface because the user must enter the function parameters in a dialog that is often illogical and hard to use. The dialogs, used to prompt the user for the parameters, are often in algebraic or mathematic expressions that many users do not understand. For example, the user must enter parameters into a series of dialog boxes that are displayed as mathematical operations, such as "X=_____." Thus, to execute the correct function in a function wizard, a user would have to find the function by the title, determine that this was the correct function, select the function, enter all the parameters in the function correctly, and finally accept the function. Even in the wizard, the user often makes mistakes and creates inoperative or incorrect functions.

Finally, the functions are simple calculations that often do not relate to the task the user wants to complete. The users cannot choose one formula having one or more functions for the task that they have to accomplish. Rather, the user must determine which functions to use, and then organize several functions to work together to complete the overall task. It is with respect to these and other considerations that the present invention was made.

SUMMARY OF THE INVENTION

The present invention relates to a task helper in a data and/or spreadsheet application. A task helper is task-based operation within the data application that helps a user create formulas for the specific task the user must complete. By focusing on the task, the task helper simplifies the process of combining multiple functions for the user and reduces errors in formula selection and input.

In one embodiment, the present invention provides a user interface that displays one or more selections of task helpers on the display device. The user interface receives a selection of a task helper from the user. Upon selecting a task helper, the data application displays a dialog. In one embodiment, the dialog is a series of sequential dialog windows, and the first sequential dialog window is displayed first. The first dialog window receives, into a user entry area, one or more parameters, from a user selection device, in response to one or more plain language statements. After receiving the parameters into the first dialog window, at least one more sequential dialog window is displayed. More parameters are received in the sequential dialog windows that follow.

In another embodiment of the user interface, the data application displays a toolbar with user selectable devices representing categories of task helpers. The data application receives a selection of a category of task helper, and, in response to the selection of a category of task helper, displays a menu having at least one selection of task helper. The user then uses the task helper to create a formula directed to their task.

Another embodiment of the user interface displays a user selectable device representing a category of task helper. The user selectable device, in one embodiment, is a button. The user interface receives a selection of that user selectable device representing the category of task helper and, in response to the selection, displays a menu having one or more user selectable devices that provide a description for the task helpers on the user selectable devices.

In still another embodiment of the user interface, a data application displays one or more selections of task helpers on the display device. The user interface receives a selection of a task helper and then displays a next user interface based on the selection of the task helper, wherein the next user interface comprises one or more sequential, plain language statements about a task. In the next user interface, the data application receives one or more parameters from a user interface selection device, wherein the user inputs the one or more parameters in response to the one or more sequential, plain language statements.

In still another embodiment of a user interface, the data application displays one or more selections of task helpers on the display device and receives a selection of a task helper. The data application then displays a next user interface based on the selection of task helper, the next user interface comprises one or more user entry areas. This next user interface receives at least one discrete parameter from a user interface selection device, wherein the discrete parameter is a portion of an automatically generated expression.

Another embodiment of a user interface displays one or more user selectable devices for one or more elements and receives a single actuation from a user interface selection device on one of the user selectable devices. In response to the single actuation of the user interface selection device, the data application displays the element in the data application without further input from a user interface selection device.

In another embodiment of a user interface, the user interface receives a focus on a cell having data created from a task helper. A focus is a visual cue in the data application that a certain device or cell is selected. For example, a data application displays a border around the selected cell within the displayed data when the cell has the focus. The user interface then displays an object near the cell indicating that the data in the cell was created with a task helper.

The present invention also provides an embodiment of a method for creating a formula to complete a task in a data application. The data application having aspects of the present invention provides one or more selections of task helpers, wherein one of the task helpers applies to the task. The data application accepts a selection of the task helper. The data application then automatically selects one or more functions to use in a formula based on the task helper and automatically generates a formula that comprises the one or more functions. The data application then displays a result of the formula in the data application that completes the task.

The present invention also provides an embodiment of a method for creating a set of descriptive statistics in a data application. The data application receives a selection of data, receives an input to create the set of descriptive statistics about the selection of data, and inserts, into the data application, two or more functions applied to the selection of data. The data application displays the set of descriptive statistics arranged in a tabular display in the data application, wherein the set of descriptive statistics are the results from the two or more functions.

Finally, the present invention provides an embodiment of a method for entering an element into a data application. Here, the data application displays one or more selections for elements and receives a single actuation of a user input device on the selection for the element. An element is an item of information that is not based on the data within the data application. The data application inserts a function that generates the element and displays the element in the data application.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of presently exemplary embodiments of the invention, and to the appended claims.

BRIEF DESCRIPTION OF THE DRAWINGS

FIG. 12B and FIG. 12C are exemplary embodiments of a result from a descriptive statistics task helper, such as the task helper of FIG. 12A, wherein FIG. 12B shows the display provided the user and FIG. 12C shows the functions inserted into the data application by the task helper according to the present invention.

FIG. 13 is an exemplary embodiment of a spreadsheet application displaying a user interface object that is selected to edit a task helper previously applied to a portion of the selected data according to the present invention.

DETAILED DESCRIPTION OF THE INVENTION

The present invention will now be described more fully hereinafter with reference to the accompanying drawings, in which embodiments of the invention are shown. The invention may, however, be embodied in many different forms and should not be construed as limited to the embodiments set forth herein. Rather, these embodiments are provided so that the disclosure will be thorough and complete and will fully convey the scope of the invention to those skilled in the art.

In general, the present invention relates to a task-based approach to creating and using formulas in a data application. A data application is an application that stores, manipulates, uses, or calculates data. Some exemplary embodiments of a data application comprise spreadsheet applications, database applications, or other applications that apply formulas to data. An exemplary spreadsheet application is the Microsoft® Excel spreadsheet application. An exemplary database application is the Microsoft® Access database application. While the present invention will be described as it relates to spreadsheet applications, one skilled in the art will recognize the present inventions applicability to other applications and that the present invention is not limited to the embodiments described herein.

Figure 1A:
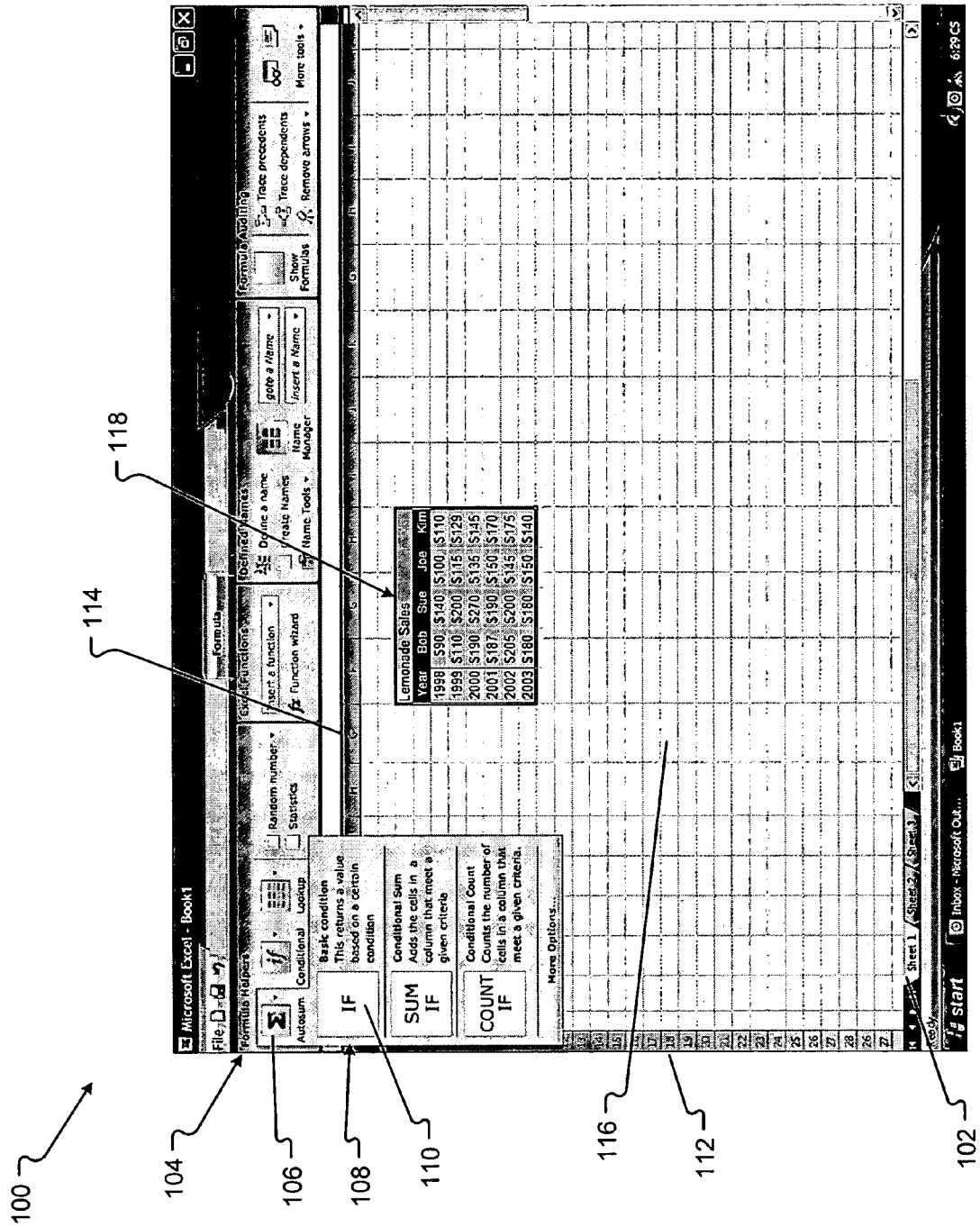
FIG. 1A is an exemplary spreadsheet application illustrating embodiments of a task helper toolbar and a task helper menu according to the present invention.

An exemplary display for a spreadsheet application 100 having aspects of the present invention is shown in FIG. 1A. To enter a formula into a cell or a range of cells, a user selects a task helper category control, such as control 106, on a task helper toolbar, such as toolbar 104, provided in spreadsheet 102. In response, spreadsheet application 100 then displays a menu of task helpers, e.g., menu 108. The menu 108 has one or more selections of task helpers, such as selection 110. The selections of task helpers provide descriptions to the user on the menu selections so that the user can quickly determine which selection will help complete the required task.

Figure 1B:
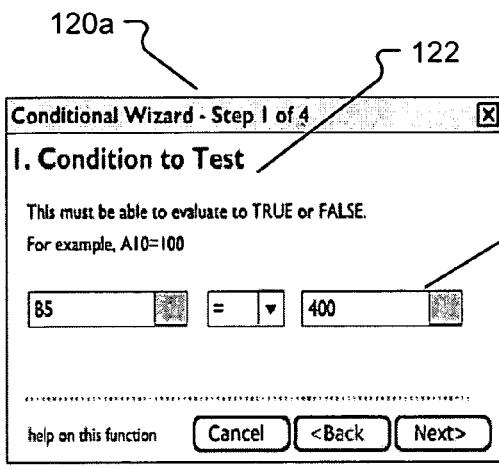
FIG. 1B, FIG. 1C, FIG. 1D, and FIG. 1E are exemplary dialog windows illustrating an embodiment of a user interface for a sequential task helper according to the present invention.
Figure 1C:
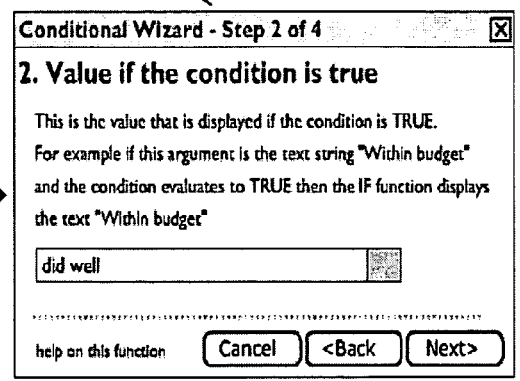
Figure 1D:
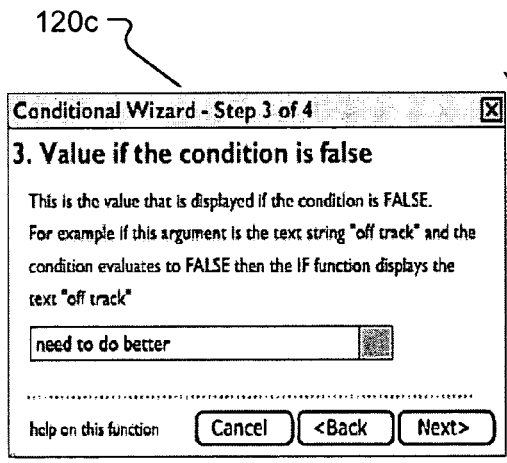
Figure 1E:
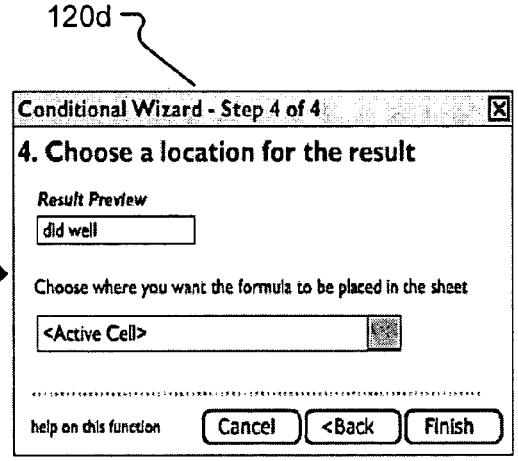

Upon selecting a task helper, the spreadsheet application 100 displays a dialog. In one embodiment, the spreadsheet application 100 displays a sequential series of dialogs 120, as shown in FIG. 1B, FIG. 1C, FIG. 1D, and FIG. 1E. The series of dialogs 120 are a series of windows, such as windows 120a, 120b, 120c, and 120d; the user sequences through the dialogs 120 to interact with the task helper. The dialogs 120 provide the user with a series of plain language prompts, such as statement 122, that are easy to understand. The user responds to the statements 122 by inputting parameters into one or more user entry areas, such as user entry area 124 (FIG. 1B). Each window 120 has at least one plain language statement and receives one or more discrete parameters. In sequencing through the dialogs windows, the user inputs all the parameters for a formula. Once finished with the task helper dialogs, the task helper builds the formula from one or more functions. The received parameters are incorporated, into the formula, in the correct syntax and the correct location. The formula is inserted into the spreadsheet 102 in the appropriate cell, and the result of the formula may be displayed for the user in the spreadsheet 102. In operation, this system of dialog windows provides the user with a relatively simple, understandable interface for formula entry that is based on the user's task.

Figure 2:
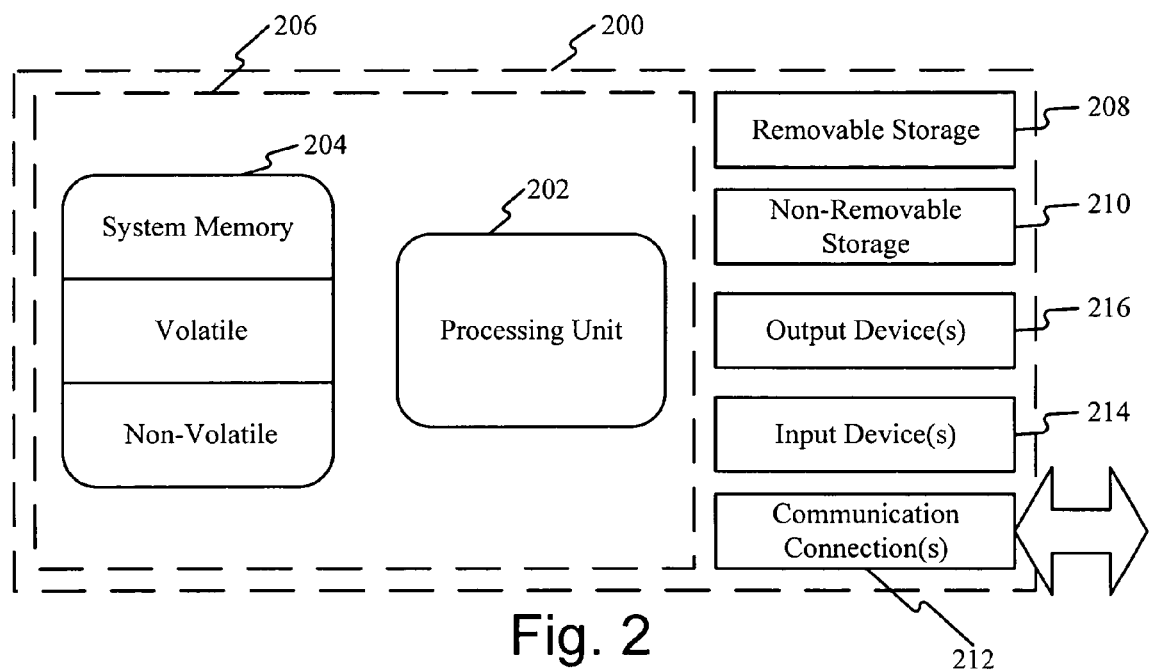
FIG. 2 is a functional diagram illustrating a computer environment and computing device operable to provide a task helper according to the present invention.

An embodiment of a suitable operating environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. These devices, either individually or in combination can form the user interface used to display the task helper and receive formula and parameter input information as described herein. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Referring again to FIG. 1A, an exemplary display 100 of a spreadsheet application 102 is shown. A spreadsheet application 102 stores and arranges data in a spreadsheet, as is known. A spreadsheet comprises a series of rows, such as row 112, and a series of columns, such as column 114. The intersecting rows and columns form cells, such as cell 116 formed from the intersection of column 114 and row 112. The cells contain items of information. The information comprises data, text, error values, formulas, and other types of information. A set of data 118 is shown in the spreadsheet 102.

In embodiments of the present invention, the spreadsheet application 100 comprises one or more user interfaces. A user interface can be a dialog, a menubar, a control, a toolbar, or other device either to display information or receive input from the user. In one embodiment, one of the user interfaces is toolbar 104. While a toolbar 104 will be described hereinafter, one skilled in the art will recognize that the functions within the toolbar may be embodied in other types of user interface elements. In one embodiment, the toolbar 104 has one or more portions of the toolbar that provide the user with certain functionality. A task helper portion is one of the portions of the toolbar 104. In one embodiment, the user may access the task helper through a help menu or help function in the spreadsheet.

The task helper portion of the toolbar 104, entitled "Task helpers" in the exemplary embodiment of FIG. 1A, contains one or more controls. A control is a device in the user interface that, when selected by a user selection device, executes an operation or other function. An example of a control is a button, such as button 106. The controls in the toolbar 104 are arranged into categories according to the type of task helpers to which the control provides. In the exemplary embodiment, three controls represent three categories of task helpers: "Autosum" helpers, "Conditional" helpers, and "Lookup" helpers. One skilled in the art will recognize that alternative embodiments may include different, fewer or more categories of task helpers. The other task helper categories may have further controls representing those types of task helpers.

Upon selecting the control 106, the spreadsheet application 100 provides a menu 108 of task helpers. A menu is a list of selectable menu items that, when selected, execute operations or functions of the spreadsheet or display submenus or further user interfaces. The menu 108 of the present embodiment provides three menu items, such as menu item 110, from which to select. The present invention provides menu items that select task helpers. Each menu item contains a description of the task helper that the menu item represents. In some embodiments, the menu items may also provide titles of the task helpers, such as "IF," "SUM IF," and "COUNT IF." In other embodiments, an icon or graphic image is also displayed, and the icon visually represents the task helper. By providing the description, the user can easily find the appropriate task helper. Instead of searching through a cryptic abbreviation list for the appropriate functions, highlighting the abbreviations, and then reading the description to check if the abbreviation represents the correct function, the user reads through the displayed descriptions and selects the appropriate menu item. Upon selecting a menu item, the spreadsheet application 100 provides a dialog or a set of dialogs, e.g., windows 120a, 120b, 120c, and 120d, for the task helper.

Figure 3:
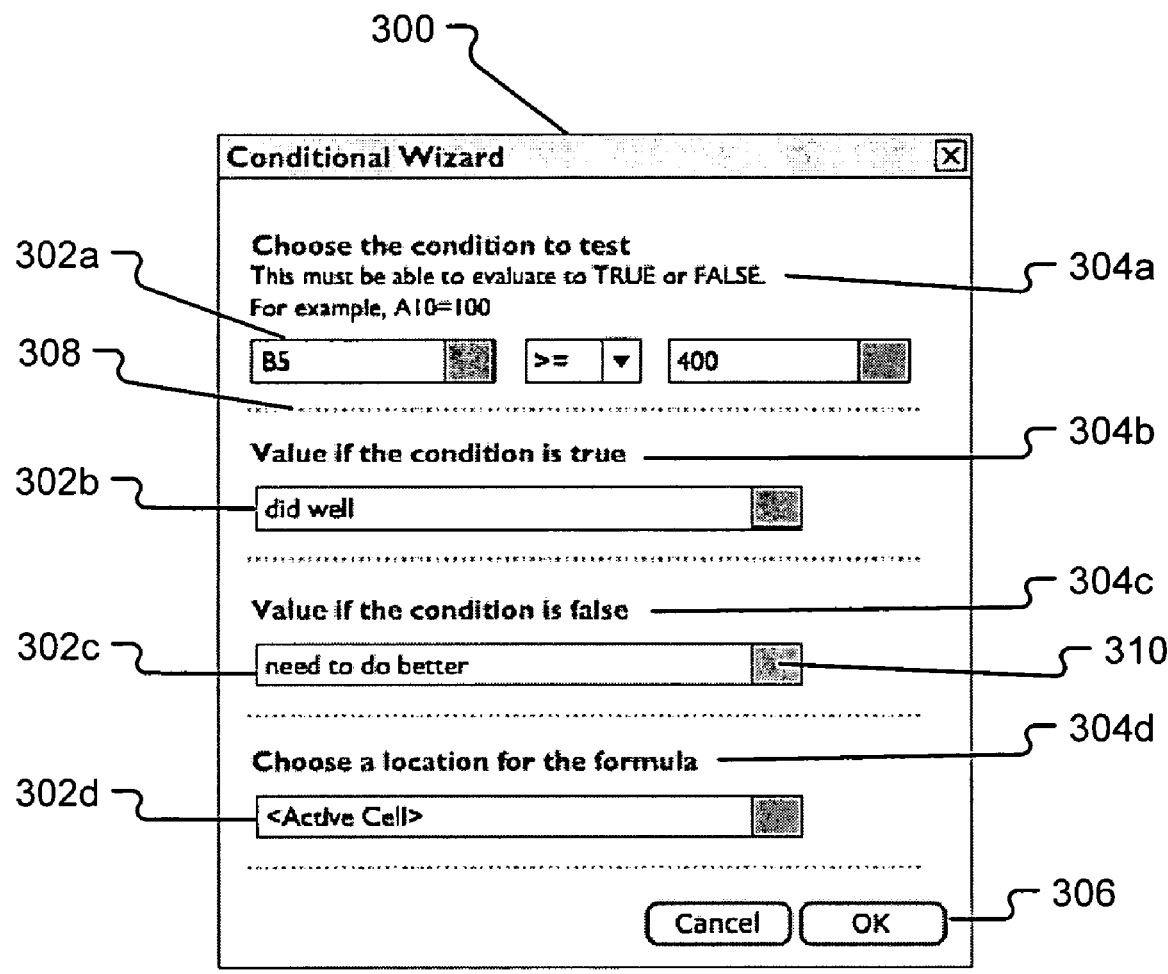
FIG. 3 is an exemplary dialog for a task helper in a single window according to the present invention.

Another embodiment of a task helper dialog is shown in FIG. 3. A dialog is an exchange of information between the spreadsheet application 100 and the user. In one embodiment, the task helper dialog is a window, such as window 300. In other embodiments, the task helper is a sequential series of dialog windows, such as 120a, 120b, 120c, and 120d shown in FIG. 1B, FIG. 1C, FIG. 1D, and FIG. 1E. A dialog, in other embodiments, also comprises a tabbed set of menus or a single menu. One skilled in the art will recognize other dialogs that can form the task helpers.

The exemplary embodiment of the task helper, in FIG. 3, is a single window dialog 300. In this alternative example, all the parameters input into the series of windows in FIG. 1B, FIG. 1C, FIG. 1D, and FIG. 1E may be input into user entry areas provided in this single window 300. The dialog window 300 displays the plain language statements 304a, 304b, 304c, or 304d for the user to respond with an input parameter. In one embodiment, an exemplary statement 304a has two parts. First, the statement has a title such as, "Choose the condition to test." Second, the statement has an explanation such as, "This must be able to evaluate to TRUE or FALSE. For example, A10=100." In other embodiments, the statement may only have a title, as shown in 304b. Either way, the plain language statements preferably solicit responses from the user.

For each plain language statement 304a, 304b, 304c, or 304d, at least one related, user entry area 302a, 302b, 302c, or 302d is provided. A user entry area is a part of the user interface where a user may input parameters into the task helper. In one embodiment, a user entry area is a dialog box, such as dialog box 302a, 302b, 302c, or 302d, where the user inputs parameters by typing on a keyboard device. Other embodiments of the dialog allow the user to select the input from the spreadsheet using a user selection device, such as a mouse. In still other embodiments, the user entry area provides a control, such as control 310, which is a "roll-up" button that rolls-up the window to allow the user to select cells within the spreadsheet. A control, in another embodiment, provides a menu that provides a list of menu items from which to select. One skilled in the art will recognize other types of user entry areas that may be used in the task helper dialog.

In still other embodiments, the spreadsheet application 102 provides the user an input parameter by semi selection. Semi selection is the process where the spreadsheet application uses a set of rules to select a cell or range of cells in the spreadsheet based on the location of the active cell. In one embodiment, the semi selection process uses the following rules:

---

1. Auto semi select Rules (in order of application)
2. If the active cell is in or adjacent to a column of data then select that column of data
3. Else if the active cell is in or adjacent to a row of data then select that row of data
4. Else if the active cell is in or adjacent to a cell with a value then we select that cell Upon selecting a cell or range of cells to select, the spreadsheet application 100 returns a reference to a cell or cells to the task helper dialog. The user accepts the reference, in the dialog, if the reference is correct.

The statements 304a, 304b, 304c, or 304d and user entry areas 302a, 302b, 302c, or 302d are arranged in a perceptible order, for instance top to bottom. In some embodiments, the different statements 304a, 304b, 304c, or 304d and user entry areas 302a, 302b, 302c, or 302d are set in separate tabbed pages within the window 300. In other embodiments, as seen in FIG. 3, the statements 304a, 304b, 304c, or 304d and user entry areas 302a, 302b, 302c, or 302d are separated by a visual indicator, such as a line 308. Again, the statements 304a, 304b, 304c, or 304d are not typical mathematical statements but plain language statements.

In embodiments of the present invention, the dialog window, whether sequential or a single window, has one or more navigation buttons, such as button 306. In the exemplary embodiment 300, the navigation buttons comprise a button for "OK" and "Cancel." In other embodiments, the dialog windows have other navigation buttons, such as the "next" and "back" buttons shown in FIG. 3. The navigation buttons 306 may be active or inactive depending on the entries or the status of the dialog window. For example, the "OK" button stays inactive until the user enters a minimum number of parameters. By selecting the "Next" or "Back" navigation buttons, the user sequences through the sequential dialog windows, as shown in FIG. 1B through FIG. 1E.

Figures 4A, 4B:
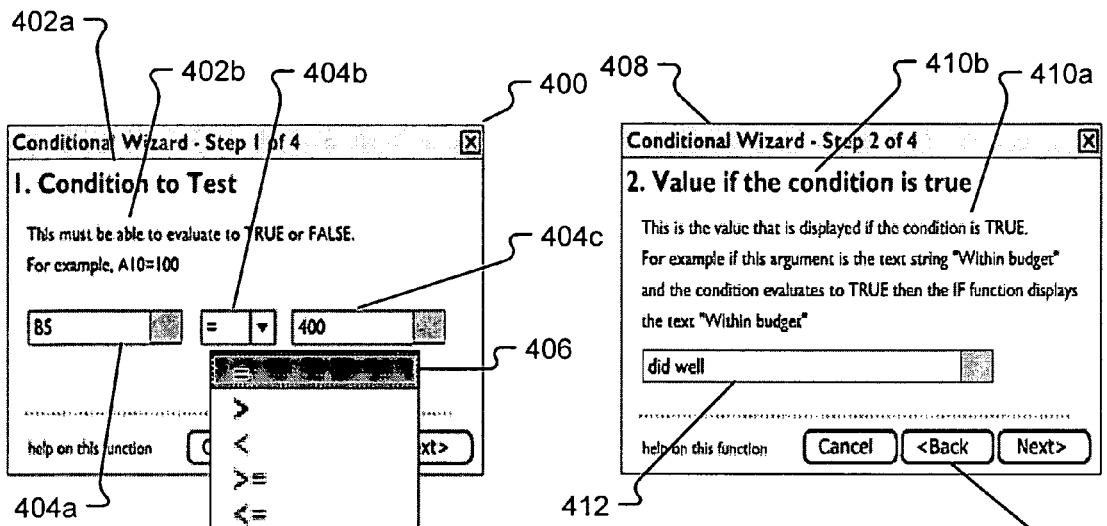
FIG. 4A, FIG. 4B, FIG. 4C, and FIG. 4D are exemplary dialog windows for an embodiment of a conditional task helper according to the present invention.

In another embodiment, the task helper comprises two or more sequential dialog windows, as shown in FIGS. 4A, 4B, 4C, and 4D. In this exemplary embodiment, the sequential dialog windows present to a user a task helper to complete a conditional task. The first dialog box 400 in the sequence is shown in FIG. 4A. A statement 402a or 402b to the user is presented in two parts 402a and 402b. The statement 402a or 402b tells the user in plain language what is sought in this dialog 400. In this embodiment, the dialog 400 solicits a condition that the user must establish.

A series of user entry areas 404a, 404b, and 404c are provided to allow the user to enter the condition in discrete steps. Thus, the user enters each part of the condition rather than enter the entire formula representing the condition. A first user entry area 404a requires the user to enter a cell or range of cells to test. In some embodiments, the user selects the cell or the range of cells. In other embodiments, the cell or the range of cells is selected via semi selection. In other embodiments, the currently active cell is pre-selected and displayed in the user entry area 404a.

The next user entry area 404b allows the user to select the condition. In some embodiments, a control box displays a menu 406 when the second user entry area 404b has the focus. The control box menu 406 contains a selectable list of all possible conditions a user may specify. In one embodiment, the conditions are displayed as mathematical operators, as shown in FIG. 4A. In other embodiments, a list of plain language statements is provided, such as "equals to," "greater than," or "less than or equal to." The spreadsheet application may warn the user if a condition is not understood. For instance, if a user enters "$" or some other non-recognized character, into the user entry area 404b, the spreadsheet application generates a pop up window that tells the user that the entered symbol is not recognized.

The final user entry area 404c, in the first dialog window 400, accepts the final part of the condition statement. In the present embodiment, the final part of the condition statement is a number. Depending on the type of data analyzed, the final part of the condition statement may be a word, a number, another formula, etc. Again, the user, in one embodiment, enters the data into the user entry area 404c with a keyboard. In other embodiments, the user selects a cell or range of cells for the input.

A user can more easily enter the discrete parameters for the condition into the dialog window of the present invention. Separating the condition statement into discrete steps allows the user to perceive what information is required for the condition statement. The user entry areas 404 provide display prompts, such as the selected cell designation in user entry area 404a, to focus the user on what information that particular user entry area requires. In addition, the drop down menu 406, ensures the user does not enter invalid conditions. The task helper automatically generates the expression for the condition by arranging the discrete parameters into the proper order with the proper syntax. In other embodiments, the task helper may automatically generate any expression within a function in the formula or within the formula from the discrete parameters input into the task helper.

If the user enters incorrect parameters, the task helper, in some embodiments, provides prompts 1902, 1904, 1906 that the parameters are invalid, as shown in FIG. 19A, FIG. 19B, FIG. 19C, FIG. 19D, FIG. 19E, FIG. 19F, and FIG. 19G. In one embodiment, the prompts are pop-up windows that display a warning message, such as exemplary embodiments 1902, 1904, 1906, 1908, 1910, 1912, and 1914. The exemplary embodiments show some of the possible warning that the present invention may provide, but the type of warnings or the displays used for the warnings are not limited to the exemplary embodiments.

The second dialog window 408 in the exemplary sequence is shown in FIG. 4B. The dialog window 408 also comprises a plain language statement having a first part 410a and a second part 410b, a user entry area 412, and navigation buttons 414. As discussed with respect to user entry areas 404a, 404b, and 404c, the user may enter information through typing, selecting, or other known methods. The input for this dialog window provides the parameter as to what result the spreadsheet application should return if the condition entered earlier is true. The third dialog window 416 receives the result to return if the condition is false.

The final dialog widow 418, in this exemplary sequence, allows the user to select a cell or range of cells where the spreadsheet application will return the result. Rather than place the formula in the active or selected cell, the present invention allows a user to enter a task helper while any cell is active or selected and return the result of the task helper to any cell or range of cells within the spreadsheet. The user inputs the cell or range of cells into the user entry area 420. In some embodiments, the user may preview the result or a part of the result in a part of the dialog window, such as window 422. A new navigation button 424, "Finish," is also presented in the final dialog window 418, which allows the user to affirm previous entries and conclude the process.

Figures 4C, 4D:
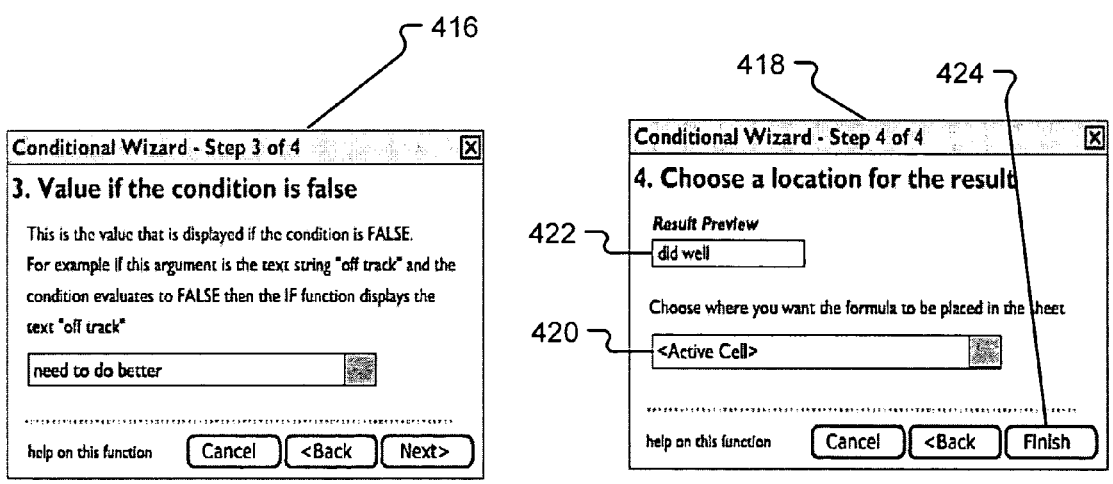

The example depicted in FIGS. 4A, 4B, and 4D returns a formula as follows:

=IF(B5=400, "did well", "need to do better")

The result of the formula is placed in the active cell. As shown in the Result Preview 422, the result would be "did well." The particular task helper of the present embodiment returned a formula with only one function, the "IF" function. However, other embodiments of the task helper may return two or more functions in a single formula. As may be appreciated, other potential embodiments, some of which are describe below, may use similar components.

Figures 5A, 5B:
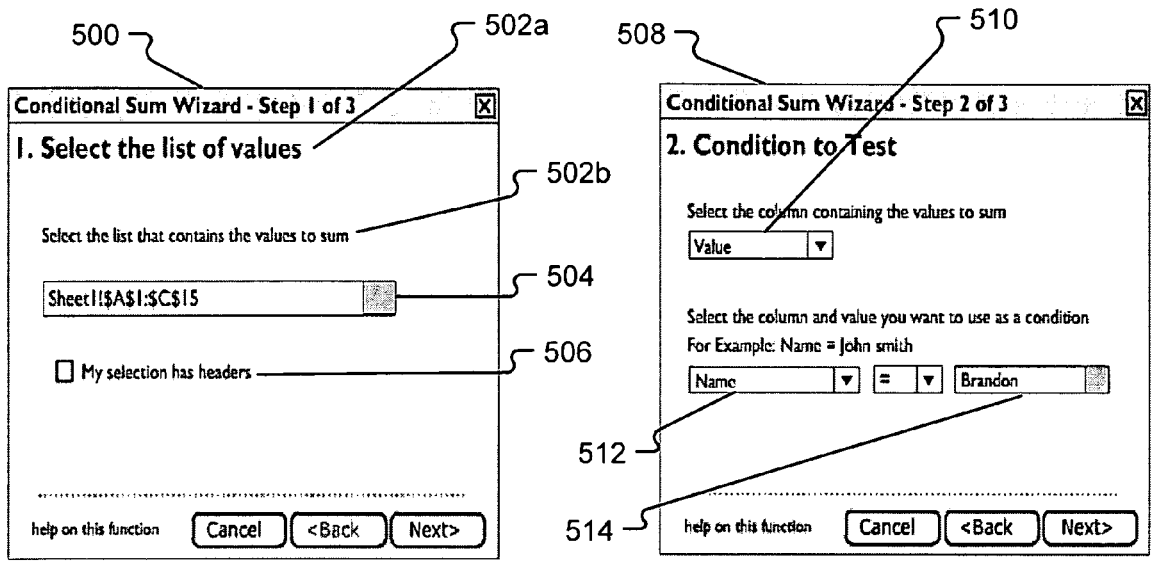
FIG. 5A, FIG. 5B, and FIG. 5C are exemplary dialog windows for an embodiment of a conditional sum task helper according to the present invention.
Figure 5C:
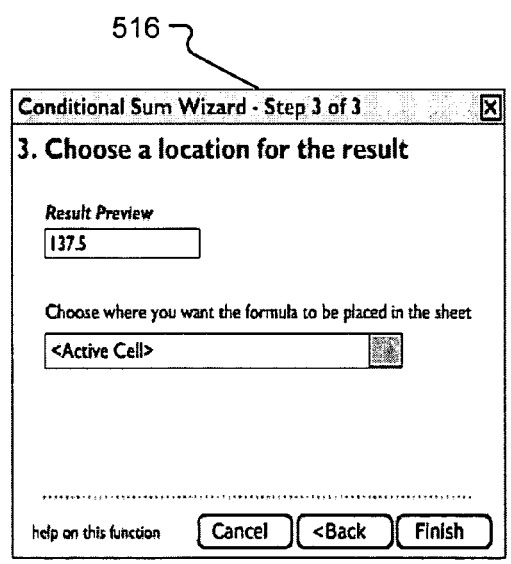

A conditional sum task helper is shown in FIG. 5A, FIG. 5B, and FIG. 5C. The first dialog window 500 is shown in FIG. 5A. As explained above, the present invention provides plain language statements to guide a user in creating a task-based formula directed at solving a particular task for the user. The dialog window 500 provides a two-part statement 502a and 502b. The statement asks for a range of cells to sum. In user entry area 504, the user can type or select a range of cells. In another embodiment, the user may accept a range of cells pre-selected via semi selection. Unlike previously described dialog windows, the dialog window 500 of the present invention also comprises a user selection 506 to signify the selected range has data headers. Data headers are textual labels related to the data either as column headers or row headers. The exemplary embodiment, shown in FIG. 5A, provides a checkbox 506 to signify that the data selected in user entry area 504 has data headers.

The second dialog window 508 provides more user entry areas. A first entry area 510 in the second dialog window 508 allows a user to specify what column of data will be summed. In one embodiment of the present invention, the user entry device 510 provides a drop down menu of the data headers in the data selection specified in user entry area 504. If the checkbox 506 is selected, the task helper scans the tops of the columns or the left sides of the rows to locate, copy, and save the data headers. Once saved, the data headers are arranged into a list and displayed in the drop-down menu in user entry area 510. In some embodiments, the process of locating data headers is accomplished regardless of whether the checkbox 506 is provided to the user or even if it is not checked. In further embodiments, other user entry areas, such as control boxes 512 and 514, also provide data headers in drop down menus.

The final dialog window 516 allows the user to specify where the formula will be returned. In the exemplary embodiment depicted in FIGS. 5A, 5B, and 5C, if the user chooses the same column to sum as to apply the condition, then the task helper returns the following formula:

=SUMIFS($C$7:$C$13, $C$7:$C$13, ">0")

However, if the user chooses a column to sum based on a condition applied to a different column, the task helper returns a different formula, such as:

=SUMIFS($C$7:$C$13, $B$7:$B$13, ">0")

The task helper allows the user to better understand how to enter the parameters of the formula without needing to understand a set of mathematical expressions. In addition, the present invention translates the user inputs, such as column header names, into cell references and places those parameters, with the correct syntax, into the correct placement within the formula.

Figure 6A:
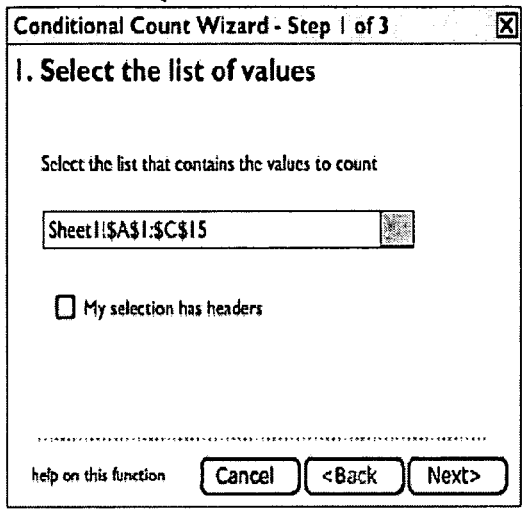
FIG. 6A, FIG. 6B, and FIG. 6C are exemplary dialog windows for an embodiment of a conditional count task helper according to the present invention.
Figure 6B:
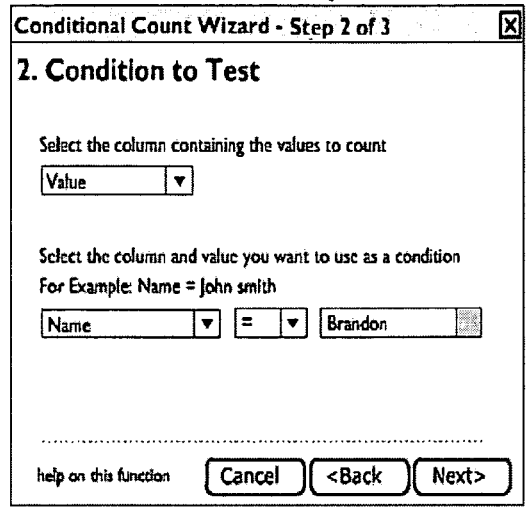
Figure 6C:
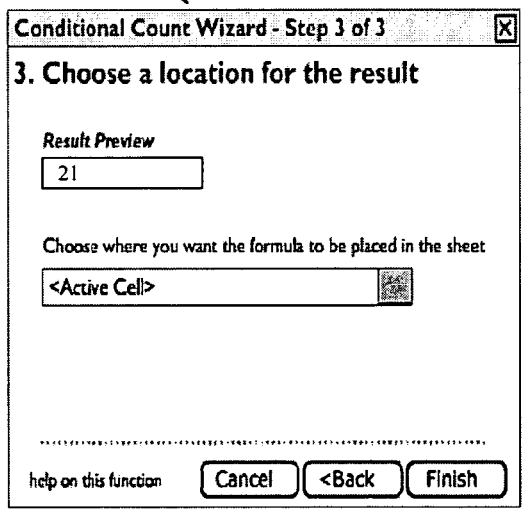
Figure 7A:
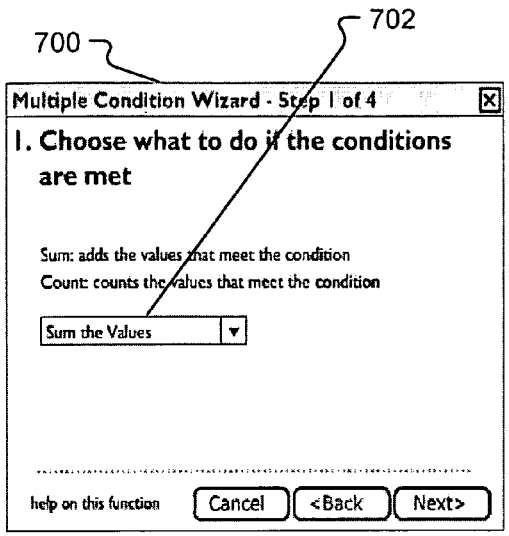
FIG. 7A, FIG. 7B, FIG. 7C, and FIG. 7D are exemplary dialog windows for an embodiment of a multiple condition task helper according to the present invention.
Figure 7B:
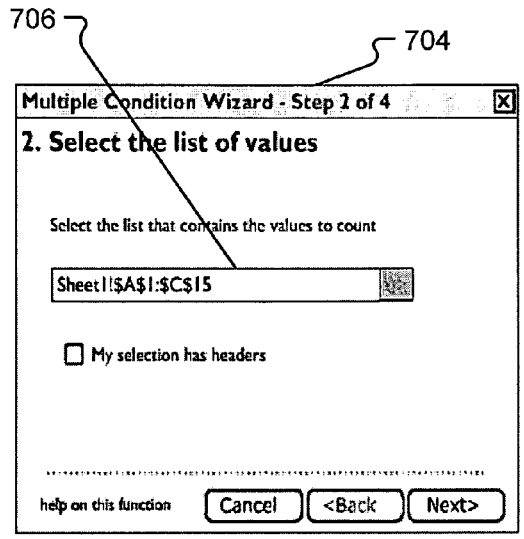
Figure 7C:
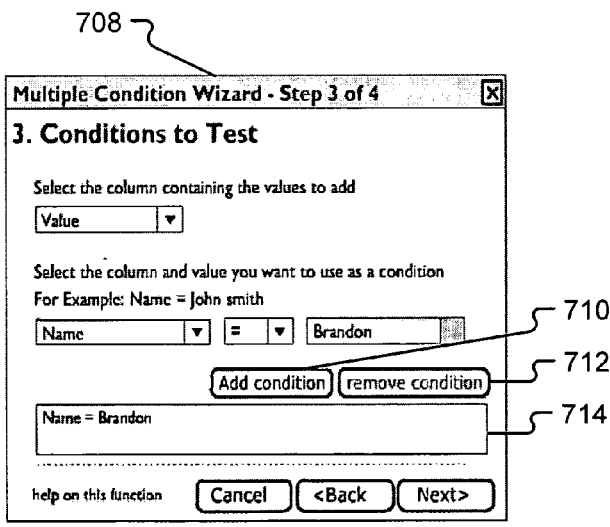
Figure 7D:
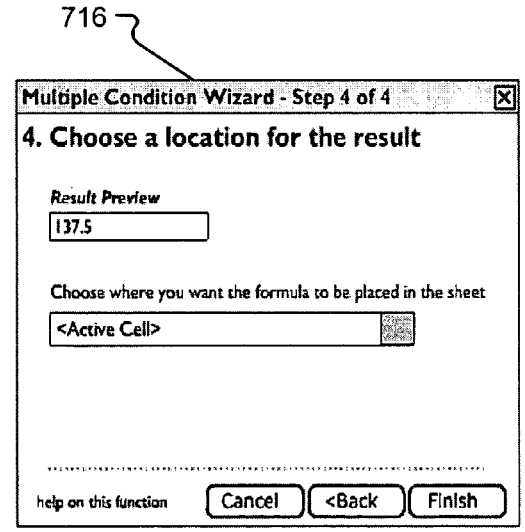

Another embodiment of a task helper, for a conditional count task, is shown in FIG. 6A, FIG. 6B, and FIG. 6C. As with the conditional-sum task helper, the conditional count helper allows the user to enter, in the first dialog window 602, a range of cells to be counted. In a second dialog window 604, the user specifies which row or column to count if a condition entered into the dialog window 604 is met. The final dialog window 606 allows the user to specify a location for the result and also to preview the result. If the user chooses the same column to count as apply the condition, then the task helper returns a formula, such as:

=COUNTIFS($C$7:$C$13, ">0")

However, if the user chooses a column to count based on a condition applied to a different column, the task helper returns a formula, such as:

=COUNTIFS($B$7:$B$13, ">0")

In another embodiment of the present invention, a task-based helper provides a user interface that allows the user to enter multiple conditions for a task. In a first dialog window 700, the user enters, into a user entry area 702, the task to be performed. In some embodiments, a control box provides a drop down menu of available tasks. A sum task is chosen in the embodiment presented in FIGS. 7A, 7B, 7C, and 7D. In a second dialog window 704, the user specifies, in user entry area 706, the input range of cells. A third dialog window 708 allows a user to specify multiple conditions. User entry areas similar to the conditional sum and condition count helpers are provided. However, a button 710 to add a condition is also shown. By selecting the "Add condition" button 710, the user entry areas, in dialog 708, are reset, and the user enters another condition. The list of conditions is shown in display area 714. By highlighting a condition in the display area 714 with a user input device and selecting the "remove condition" button 712, the user deletes the condition. The user specifies the output location in the final dialog window 716. If the user required a counting task, the multiple condition task helper returns a formula such as:

=COUNTIFS($F$13:$F$21, "=bill", $E$13:$E$21, "=PM")

If the user requires a summing task, the task helper returns a formula such as:

=SUMIFS($G$13:$G$21, $F$13:$F$21, "=bill", $E$13:$E $21, "=PM")

The exemplary embodiment demonstrates that the user need not specify a task before choosing a task helper. Rather, the task helper provides several tasks and retrieves the appropriate function to accomplish the task. In addition, the task helper allows the user to employ the same user interface to enter several conditions. Then, the task helper can arrange the multiple conditions in the appropriate syntax to create a functioning formula. The user does not necessarily have to enter the syntax correctly for the multiple conditions.

Figure 8A:
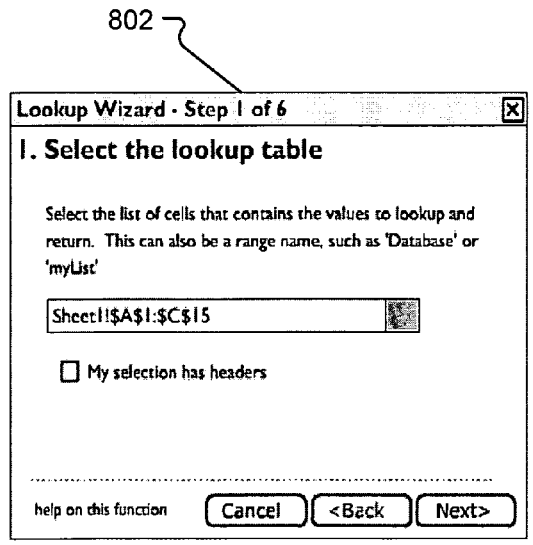
FIG. 8A, FIG. 8B, FIG. 8C, FIG. 8D, FIG. 8E and FIG. 8F are exemplary dialog windows for an embodiment of a lookup task helper according to the present invention.
Figure 8B:
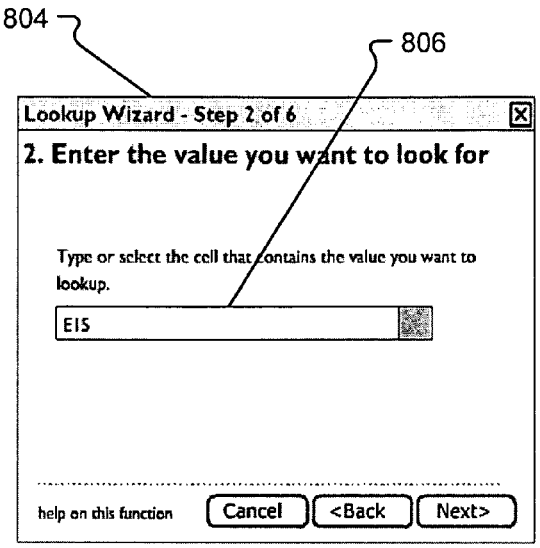

In another embodiment, a task based helper for a lookup task is shown in FIG. 8A, FIG. 8B, FIG. 8C, FIG. 8D, FIG. 8E, and FIG. 8F. The lookup task allows the user to scan a selection of data for a selected piece of information and return a result if the piece of information is found. A first dialog window 802, as shown in FIG. 8A, displays a statement and receives a selection of data from the user. A second dialog window 804, as shown in FIG. 8B, receives an input for what information for which the formula should look. The input of information is received in user entry area 806. In some embodiments, the input is selected through semi selection.

Figure 8C:
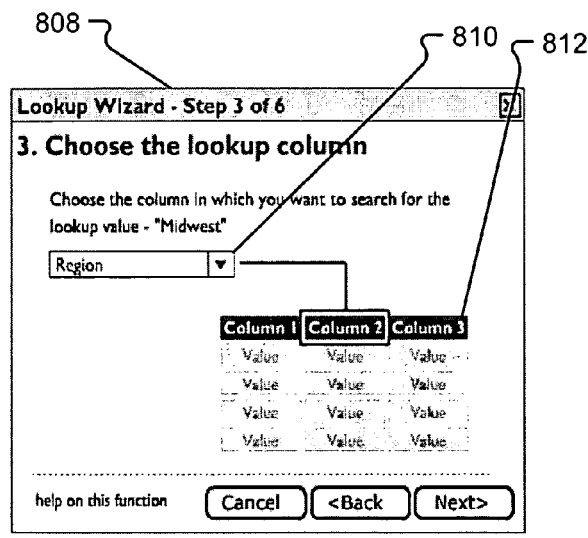

A third dialog window 808, shown in FIG. 8C, allows the user to specify a portion of the data to search for the item of information. In one embodiment, the user may select a data header for a column or row of data in the user entry area 810. Thus, the formula will scan only the row or column with the selected data header. In one embodiment, a visual representation 812 of the location of the data header within the spreadsheet is shown. The visual representation 812 is static in some embodiments. Thus, the image is a set image that does not change. In other embodiments, the visual representation 812 is an actual image of a portion of the data application. Thus, the visual representation 812 displays the actual row or column the user is selecting.

Figure 8D:
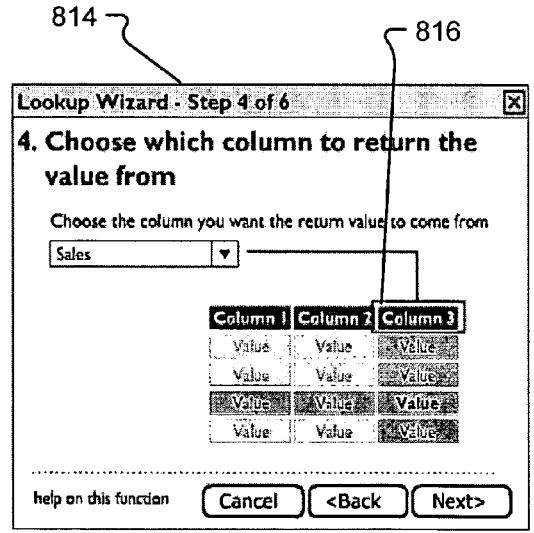
Figure 8E:
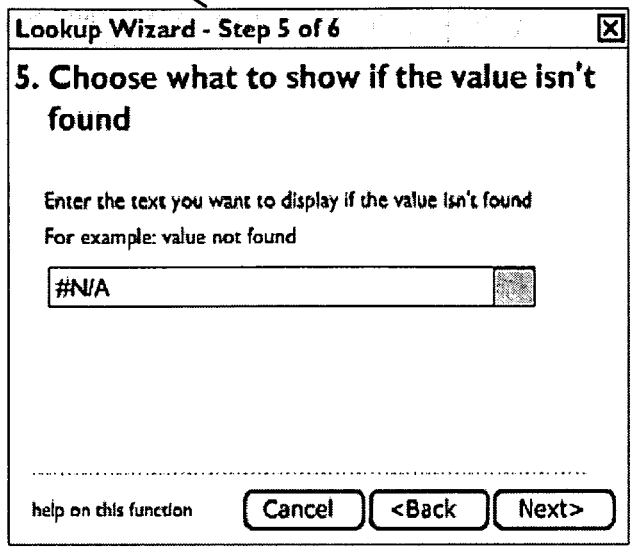
Figure 8F:
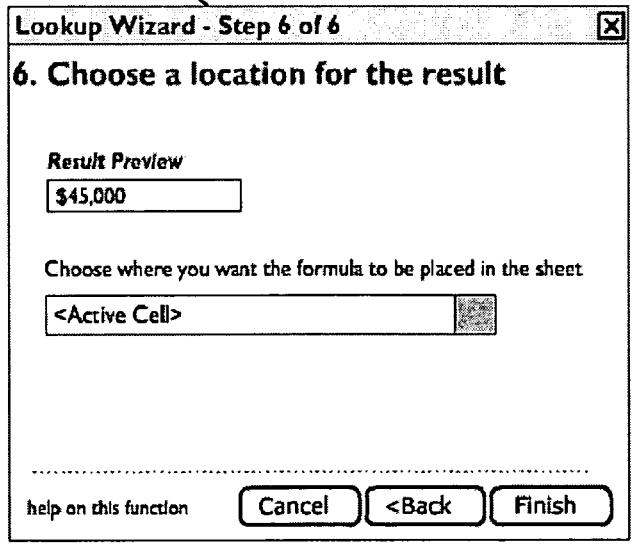

A fourth dialog window 814, shown in FIG. 8D, allows the user to select data from which to return the result. In some embodiments, the fourth dialog window 814 also includes a visual representation 816. As shown in FIG. 8E, the fifth dialog window 818 allows the user to specify a result if the information is not found in the selection of data. Finally, a sixth dialog window 820 allows the user to input where to return the result and, in some embodiments, preview a result, as shown in FIG. 8F.

Figure 9A:
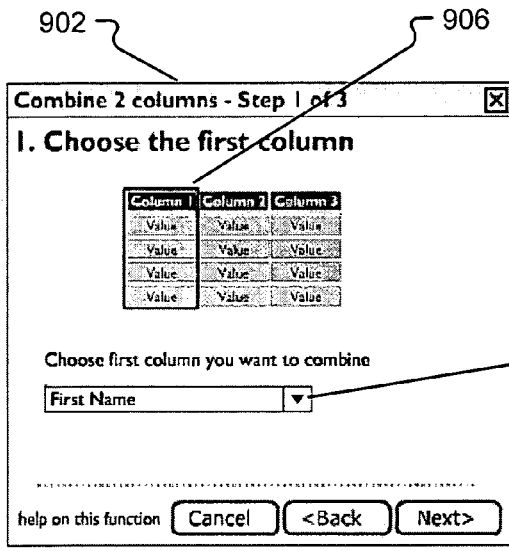
FIG. 9A, FIG. 9B, and FIG. 9C are exemplary dialog windows for an embodiment of a combine columns task helper according to the present invention.
Figure 9B:
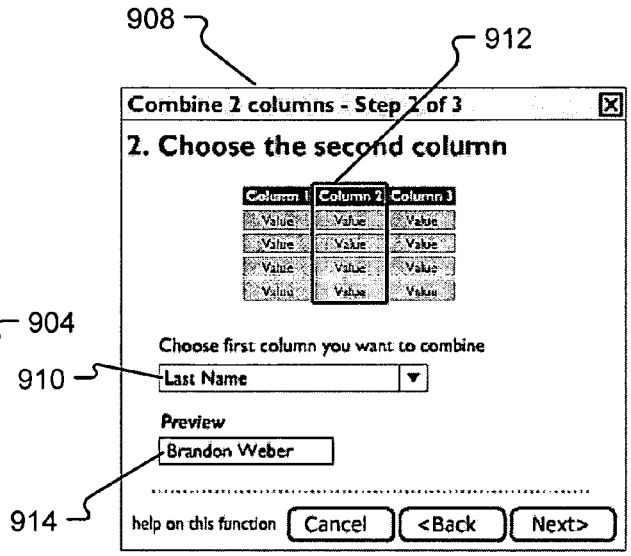
Figure 9C:
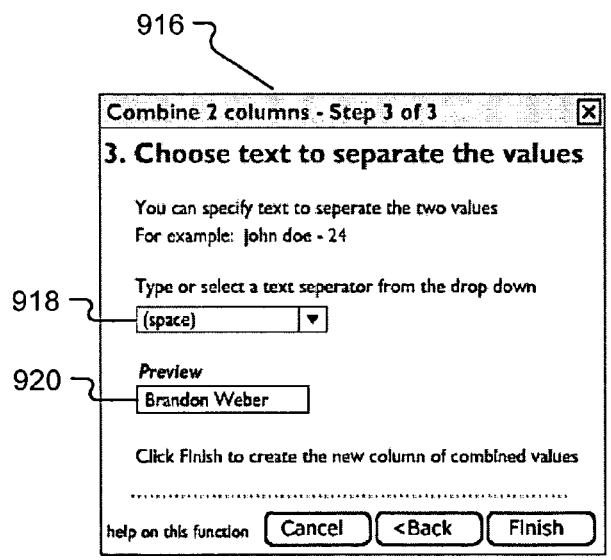

Another embodiment of a task helper, shown in FIG. 9A, FIG. 9B, and FIG. 9C allows a user to combine two columns. The first dialog window 902 has a user entry area 904 where the user can select a first column to combine. In some embodiments, the task helper scans the data headers and provides the user with a menu of data headers to select. In still other embodiments, the dialog window 902 also provides a visual representation 906, as explained above, as to the location of the selected data. In a second dialog window 908, the user may enter a second column to combine, as shown in FIG. 9B. As with the first dialog window 902, the second dialog window 908 has a user entry area 910 and, in some embodiments, has a visual representation 912 of the location of the data selected. In some embodiments, the second dialog window 908 also displays a preview 914 of the result. A third dialog window 916 allows the user to specify how the data will be separated in the new column. In one embodiment, a control box 918 provides the user with a drop down menu with possible separators, such as a space, comma, or semicolon. A result preview 920 is also provided in this window in some embodiments. In the above embodiments, the user did not need to determine the formula or formulas required to complete the task. Rather, the user determined the task, such as a conditional sum, entered the information and the system returned the appropriate formula containing the appropriate functions and parameters. In addition, the task helpers allow the user to respond to simple plain language statements rather than mathematical functions, and the response are entered discretely without the user needing to create complete mathematical formulas.

Figure 10A:
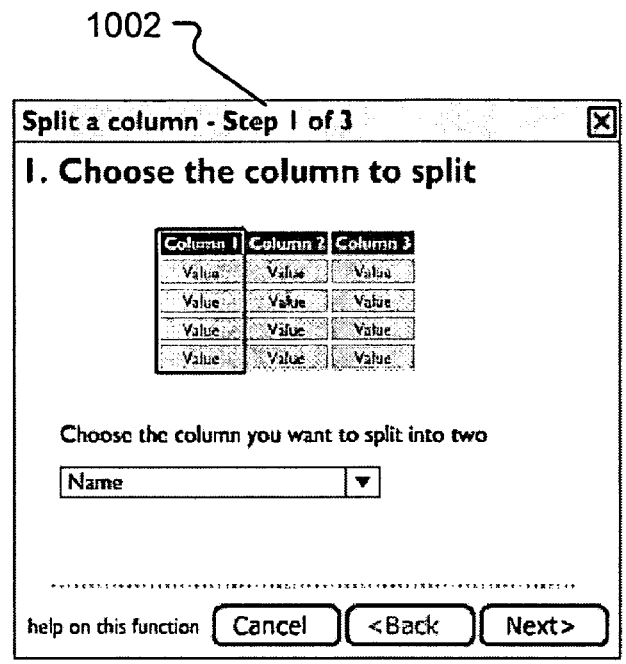
FIG. 10A and FIG. 10B are exemplary dialog windows for an embodiment of a split column task helper according to the present invention.
Figure 10B:
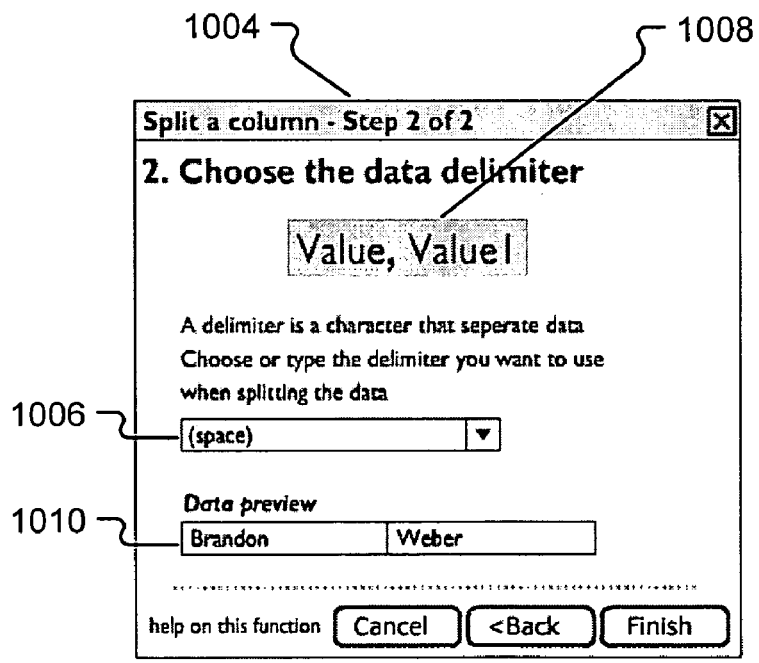

In another embodiment, a task helper for splitting an existing column is shown in FIG. 10A and FIG. 10B. A first dialog window 1002, as shown in FIG. 10A, allows the user to specify the column to separate. A second dialog window 1004 allows the user to choose a data delimiter in dialog box 1006, as shown in FIG. 10B. A data delimiter is the character that separates the two pieces of data that will be placed into two columns. A data delimiter is a textual character such as a comma, a space, a semicolon, or a colon. In one embodiment, the second dialog window 1004 scans the column to be split and displays a discovered or determined data delimiter. In other embodiments, the determined data delimiter is shown in a visual representation 1008. The visual representation 1008 may also be a static example in other embodiments. A drop down menu may also provide common delimiters in other embodiments. The second dialog window 1004 also comprises a result preview 1010 in some embodiments. The result preview 1010 shows two cells of data that contain data from the single column, and thus, displays an example of how each column will appear.

In another embodiment of the present invention, a menu 1102 for quick selection of simple mathematical tasks is shown. The menu 1102 provides a description of each task helper within the menu item and may also include a "more functions" option to access other, not shown, functions. In some embodiments, the menu item also comprises a title or an icon. When selected, the spreadsheet application inserts the function for the operation (in this case, the mathematical operation) into the spreadsheet. A range of cells is selected by semi selection. The spreadsheet highlights the selection of cells and allows the user to change or accept the selection. Once the user is satisfied with the selection, the user actuates an input device, e.g., selects the appropriate control using a mouse or presses the appropriate key on a keyboard, etc., and the function is applied to the selection.

Figure 11A:
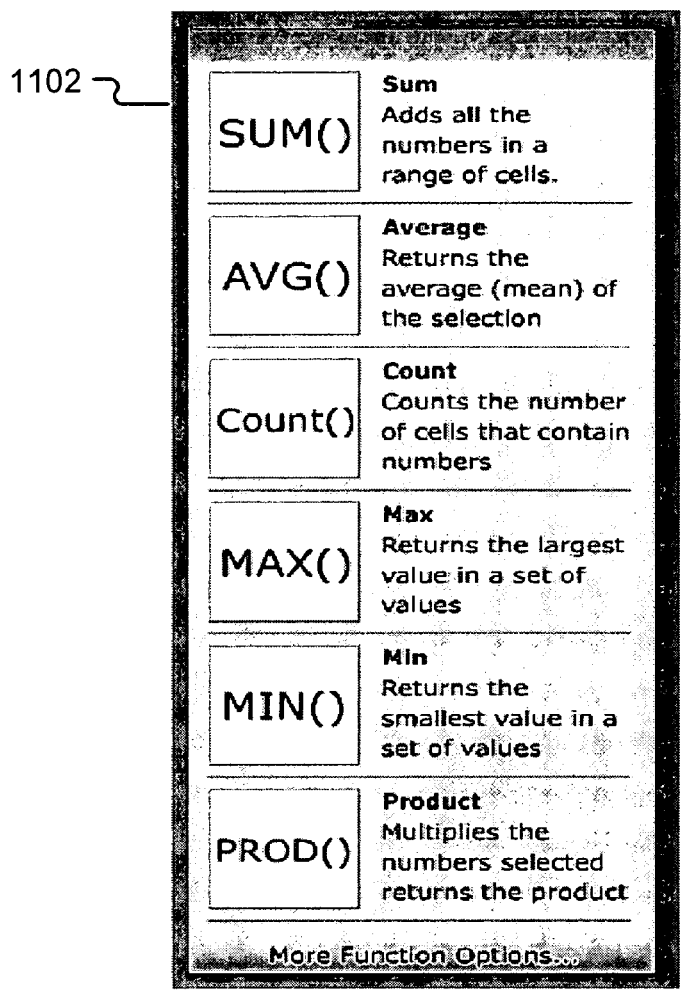
FIG. 11A and FIG. 11B are exemplary embodiments of menus providing task helpers with simple descriptions and menus for elements according to the present invention.
Figure 11B:
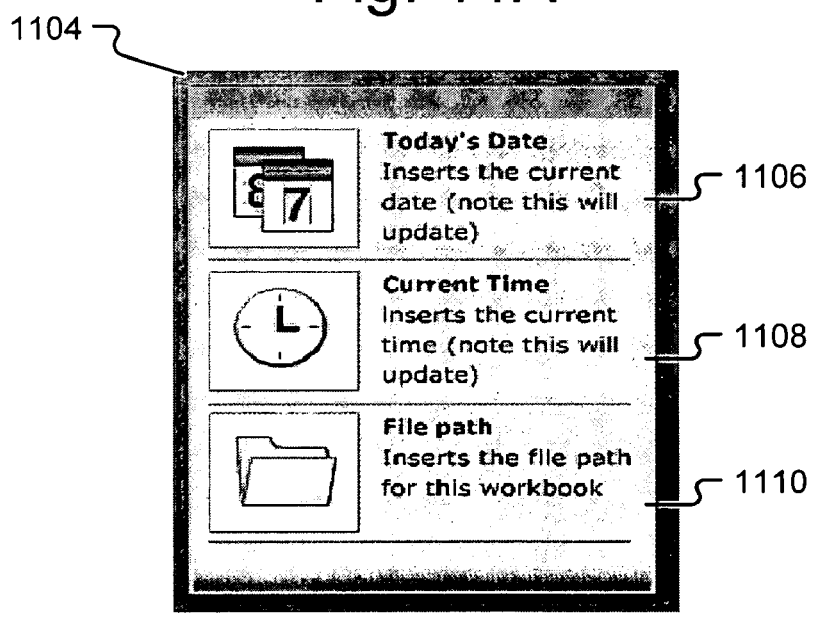

In another embodiment of the present invention, a one-click menu 1104 to insert elements into the spreadsheet is shown in FIG. 11B. In one embodiment, the menu 1104 is displayed after selection of a control in a toolbar. In another embodiment, the menu 1104 is displayed after selecting a control in a menubar. The menu 1104 has one or more menu items. The menu items represent task helpers that insert elements into a spreadsheet.

With respect to menu 1104, the "elements" that may be inserted generally relate to items of information that are not derived from the data within the spreadsheet. Rather, the element describes the spreadsheet or is an item of information not related to the data. By way of example and not limitation, an element may be a current date, a current time, a filename, a file path, a random number, or some other like information. Users often require elements to calculate relevant information. For example, if a user has a birth date for an individual, the user can calculate the individual's current age by subtracting the individual's birth date from a current date value, which is an "element."

Each menu item in menu 1104 represents an element. As shown in the exemplary embodiment, menu item 1106 provides the current date, menu item 1108 provides the current time, and menu item 1110 provides the file path. The menu items have descriptions in the selections. In addition, some embodiments provide an icon or a title for the element task helper. For example, in menu item 1108, an icon for a clock represents that the task helper that provides a current time.

In operation, a user selects, with an actuation of a user input device, a menu item to insert the element into the spreadsheet. In one embodiment, the user moves a mouse cursor over the menu, and when the mouse cursor is over the desired menu item, the user clicks the mouse once, and the element is inserted into the active cell. The user does not need to make any additional actuation of a user input device, after selecting the menu item, to insert the element. In another embodiment, the user moves a focus from menu item to menu item, using the mouse or other device, until the desired menu item has the focus. The user actuates the user input device once, and the element is inserted. Alternative embodiments are contemplated, such as embodiments that may automatically insert the element once the mouse cursor hovers over the item for a predetermined period of time.

Figure 12A:
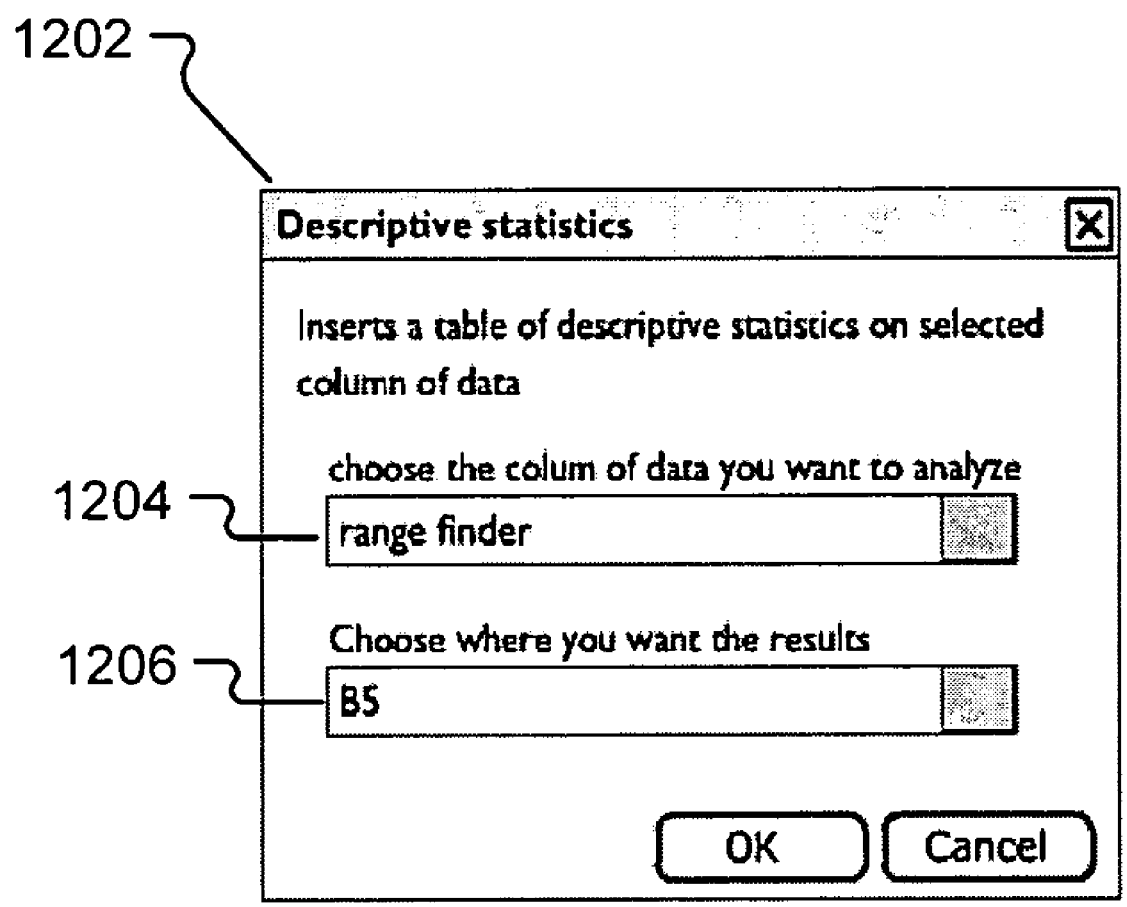
FIG. 12A is an exemplary embodiment of a dialog window that receives inputs to create a set of descriptive statistics according to the present invention.

In another embodiment of the present invention, a user selects a task helper to provide descriptive statistics, as shown in FIG. 12A. The spreadsheet application 100 provides a dialog window 1202. A user entry area allows the user to input a range of data to analyze. In one embodiment, the spreadsheet application 100 scans the data for data headers and displays the data headers in a menu. The user specifies the location, in dialog box 1206, to place the results in another user entry area. In one embodiment, the user does not specify the location to place the results, and the results are inserted at the active cell.

The descriptive statistics task helper returns a set of data 1208, e.g., the set of data in FIG. 12B. The set of data contains two or more items of descriptive data. By way of example and not limitation, the descriptive statistics comprise a mean, a mode, a range, a standard deviation, a maximum, a minimum, a sum, a standard error, a sample variance, skewness, a Kurtosis, a sum, or a count. In one embodiment, the descriptive statistics are arranged in a table with a list of titles in one column and the list of related descriptive statistics in an adjacent column. The functions returned with the exemplary task helper are shown in table 1210 in FIG. 12C. Table 1210 shows the underlying functions inserted into the spreadsheet by the task helper that provide the descriptive statistics in table 1208.

In another embodiment of the present invention, an object 1302 is displayed in the spreadsheet 1300 if the information within a cell was provided by a task helper, as shown in FIG. 13. The object 1302 can be a control or other selectable device. In one embodiment, the object 1302 is a control asking whether the user would like to edit the task helper, as shown with control 1304. A user may select the control 1302 or 1304 to display the task helper dialog with the parameters that the user previously provided. In one embodiment, the user must place the focus on the appropriate cell or portion of the cell, such as a drag handle portion, before the object will be displayed.

Figure 14:
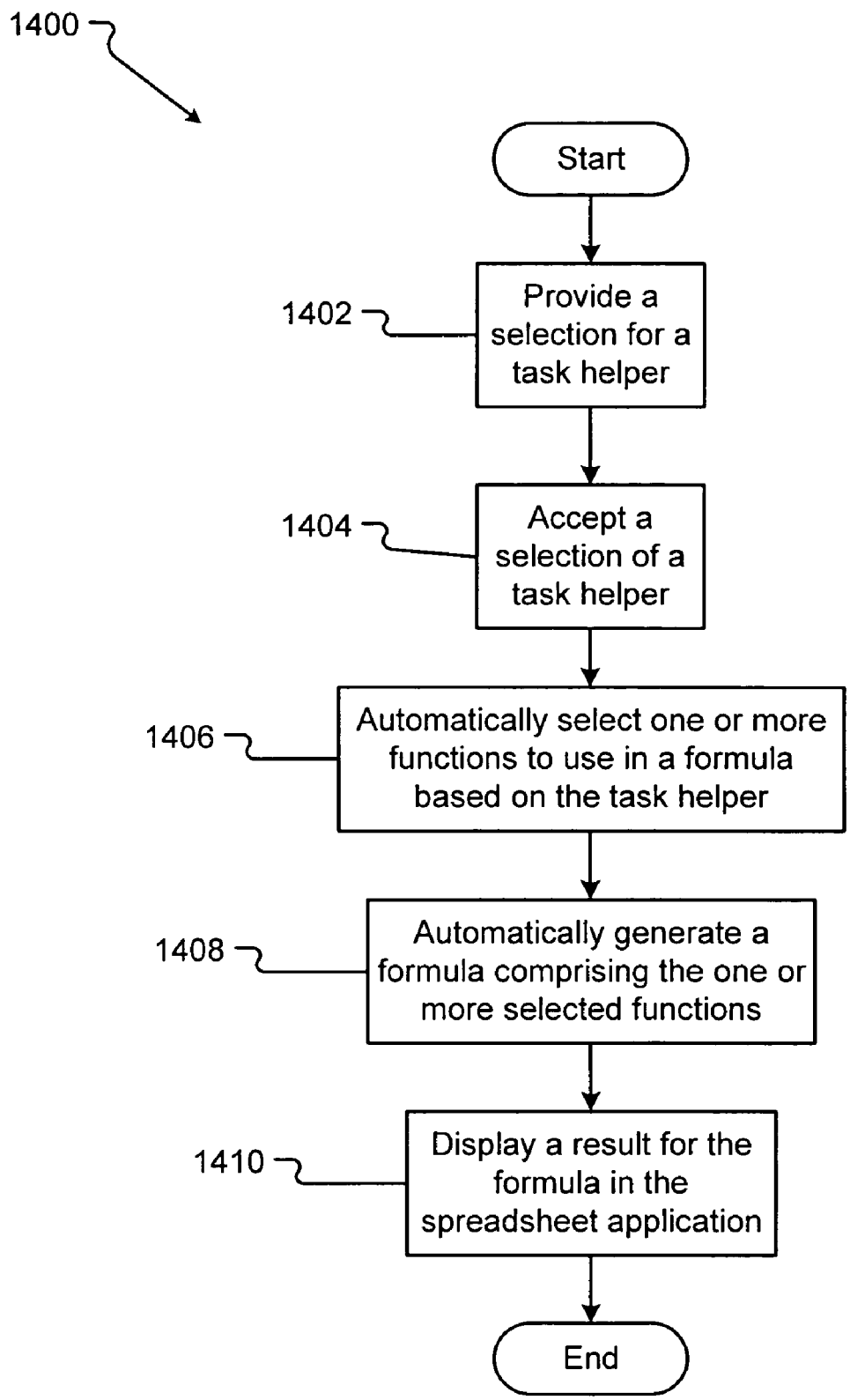
FIG. 14 is a flow chart of function steps according to an embodiment of a method for creating a formula using a task helper according to the present invention.

An exemplary embodiment of a method 1400 for creating a formula to complete a user task in a data application is shown in FIG. 14. A provide operation 1402 displays a selection for a task helper. In one embodiment, a menu with menu items providing the task helpers is displayed. The accept operation 1404 receives a user input that selects a task helper. In an embodiment, the user selects a menu item, such as menu item 110, from the task helper menu, such as menu 108. Based on the task addressed by the task helper, the select operation 1406 automatically selects one or more functions to use in a formula. For example, if the user chose the descriptive statistics task helper, the task helper selects the set of functions shown and described above in conjunction with FIG. 12C. The functions selected are stored in memory.

A generate operation 1408 automatically generates the formula that addresses the task. The formula comprises the functions stored in memory and any received parameters. In one embodiment, the task helper places the functions in the correct location in the formula. Then, the task helper inserts the parameters, in the correct syntax, into the functions. The formula is then inserted into the spreadsheet. A display operation 1410 displays the result from the formula. In one embodiment, the spreadsheet executes the formula against the selected data. The result is shown in the cell or cells selected as the location to place the result. The underlying formula is saved in a cell table within memory.

Figure 15A:
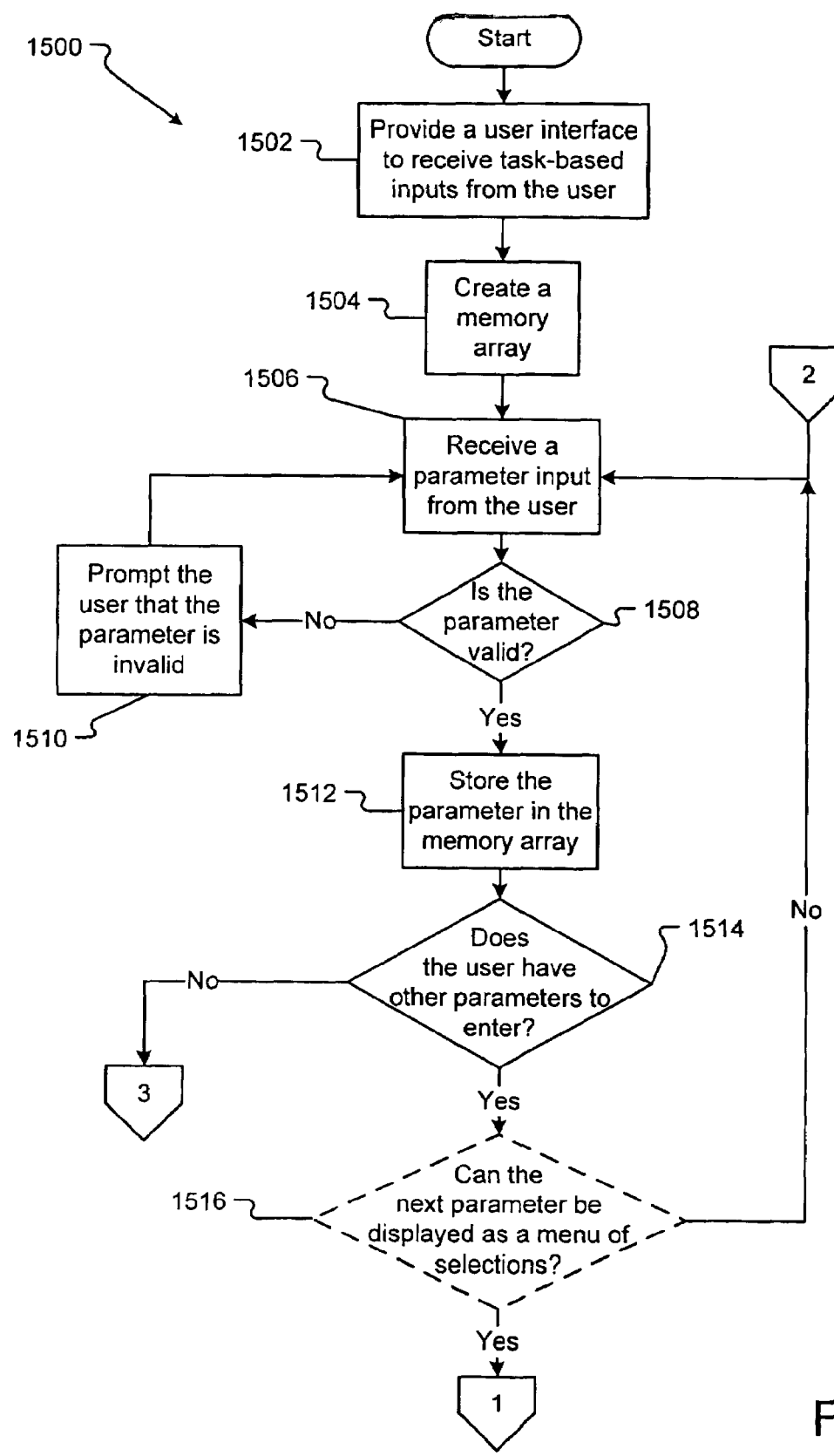
FIG. 15A and FIG. 15B are flow charts of function steps according to an embodiment of a method for automatically generating a formula for a task according to the present invention.
Figure 15B:
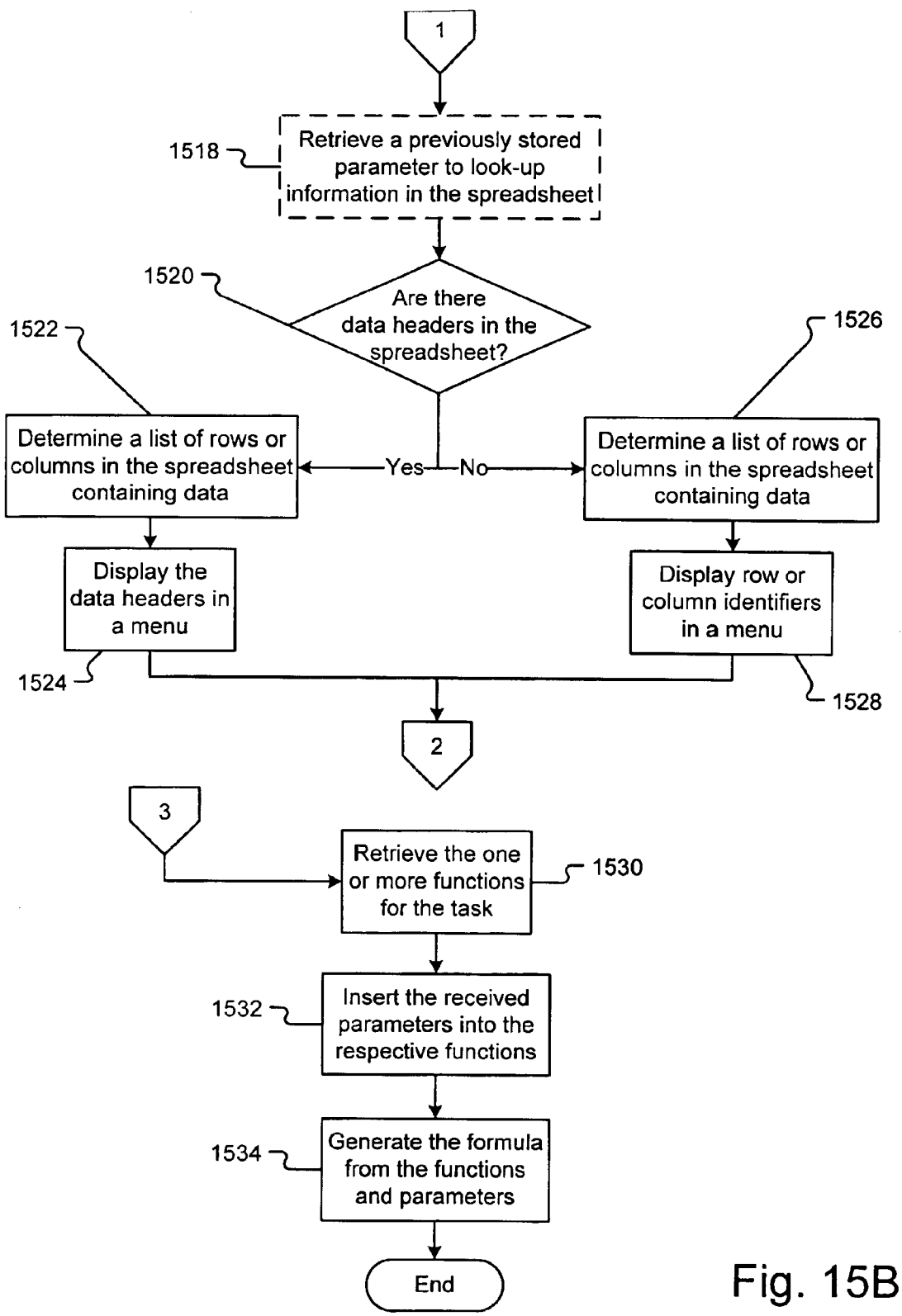

A further embodiment of a method 1500 for the automatic generation operation 1408 is shown in FIG. 15A and FIG. 15B. In this embodiment, a provide operation 1502 displays a user interface on the display device. The user interface is a dialog, such as dialog 300, that receives inputs from the user. In one embodiment, the user interface is a sequential series of dialog windows, such as dialog window 120. The dialogs have one or more user entry areas, such as dialog box 404, for the user to input parameters into the dialog. A create operation 1504 creates an array in memory to store the input parameters.

A receive operation 1506 receives an input parameter from the user in the dialog. In one embodiment, the parameters are discrete parameters. In one embodiment, the task helper evaluates the input parameter against the data and the task being completed. A validity operation 1508 determines if the parameter is valid. For example, some tasks require that the input parameter be a single cell. If the user entered a range of cells for the parameter, the input would be invalid. If the input is invalid, a prompt operation 1510 prompts with a warning, such as prompt 1902, that input was invalid and allows the user to enter a new parameter in receive operation 1506. If the parameter is valid, a store operation 1512 saves the parameter in the memory array. In one embodiment, the stored parameter receives an identification number and both the identification number and the value for the parameter are stored in the memory array. In one embodiment, the memory array stores parameters in the order of receipt.

A determine operation 1514 determines if the user has any other parameters to input. In one embodiment, if the user selects the "Finish" navigation button in the dialog window, then the determine operation 1514 determines that the user has no other parameters to enter. In another embodiment, a certain number of parameters may be required. If the user fails to enter all the required parameters, the determine operation 1514 knows the user is not finished inputting parameters. In still another embodiment, if the user has not sequenced to one or more of the sequential dialog windows, the determine operation 1514 knows that the user has more parameters to enter. If the determine operation 1514 determines that no further parameters are to be entered, the method proceeds through connector 3 to the retrieve operation 1530 in FIG. 15B.

If other parameters are to be input, then an optional determine operation 1516 determines if the next parameter to be entered can be displayed in a menu, such as menu 406. In one embodiment, the optional determine operation 1516 occurs for every possible parameter to be entered. If the parameter cannot be displayed in a menu, the method proceeds to receive operation 1506. However, if the parameter can be displayed in a menu, the method proceeds through connector 1 to the optional retrieve operation 1518 in FIG. 15B.

The optional retrieve operation 1518 references the memory array for a past parameter that designated the data to be used in the task helper. For example, if the user selected a set of data that had three columns, the optional retrieve operation 1518 references the memory array to obtain the location of the set of data. A search operation 1520 determines if any data headers are in the referenced set of data. In one embodiment, the user selects a control that designates that the data has data headers. In another embodiment, the task helper scans the metadata for cells at the top of the columns or at the left edge of the rows to determine if data within those cells are likely data headers. If there are data headers, a determine operation 1522 determines the list of columns or rows in the referenced data selection. The determine operation 1522 retrieves the list of data headers for the list of columns or rows. Display operation 1524 assembles the list of data headers into a menu and displays the menu in the dialog. If there are not data headers, determine operation 1526 determines the list of rows or columns in the data selection. Determine operation 1526 retrieves the column or the row designations, such as column A, column B, etc., and creates a list of the column or the row designations for the columns or the rows containing data. Display operation 1528 assembles the list of column or row designations into a menu of the column or the row identifies and displays the menu in the dialog. The method proceeds from display operation 1524 or display operation 1528 through connector 2 to the receive operation 1506 in FIG. 15A.

When all parameters are input, retrieve operation 1530 retrieves the functions that were selected for the task. The task helper organizes the functions into a formula. The task helper generates the proper syntax and places the functions into the proper order and location within the formula. Insert operation 1532 references the memory array. Each parameter stored in the memory array that should go into a function is retrieved. The generate operation 1534 assembles the functions and parameters into a formula. The retrieved parameters are modified to have the proper syntax and combined with other parameters if required. The parameters are inserted into the functions and create the formula that addresses the user's task.

Figure 16:
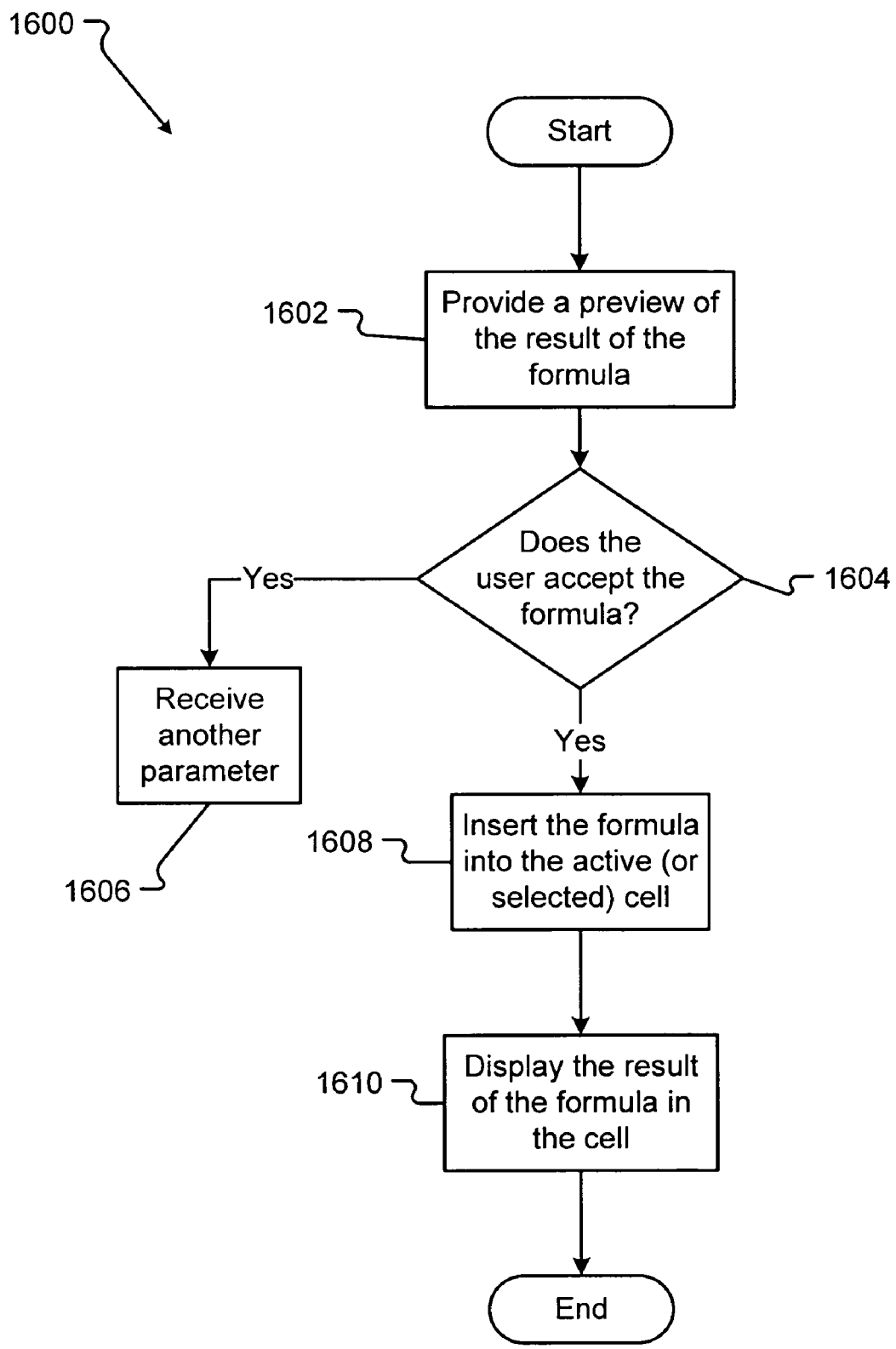
FIG. 16 is a flow chart of function steps according to an embodiment of a method for displaying the result of a formula automatically generated by a task helper according to the present invention.

A further embodiment of display operation 1410 in FIG. 14 is shown in FIG. 16. The display method 1600 has a provide operation 1602 that displays a result preview, such as result preview 422, in the dialog. In some embodiments, a window box within a dialog shows an exemplary result for the task helper. In one embodiment, a first result created from a first analyzed cell is used for the preview. In other embodiments, the result preview shows more than one cell to convey what the result will appear such as in the spreadsheet. An accept operation 1604 determines if the user accepts the formula generated by the task helper. In one embodiment, the user selects the "Finish" navigation button, and the determine operation 1604 knows that the user accepts the formula. Presumably, the user would select finish after approving the result preview.

If the user does not accept the formula, a receive operation 1606 receives another parameter or a replacement for an existing parameter. In other embodiments, if the user selects the "Cancel" navigation button, the task helper is terminated, and the user returns to the spreadsheet. However, if the user accepts the formula, an insert operation 1608 inserts the formula into the spreadsheet. In one embodiment, the formula is placed in a single cell. In a further embodiment, the cell is the active cell. In another embodiment, the formula is one or more functions that are inserted into one or more cells. For example, the descriptive statistics, such as descriptive statistics 1208, occupy several cells. In another embodiment, the user specifies a location to place the result, and the task helper inserts the formula into the selected cell or cells. A display operation 1610 displays the result of the calculated formula in the cell or cells with the inserted formula or formulas.

Figure 17:
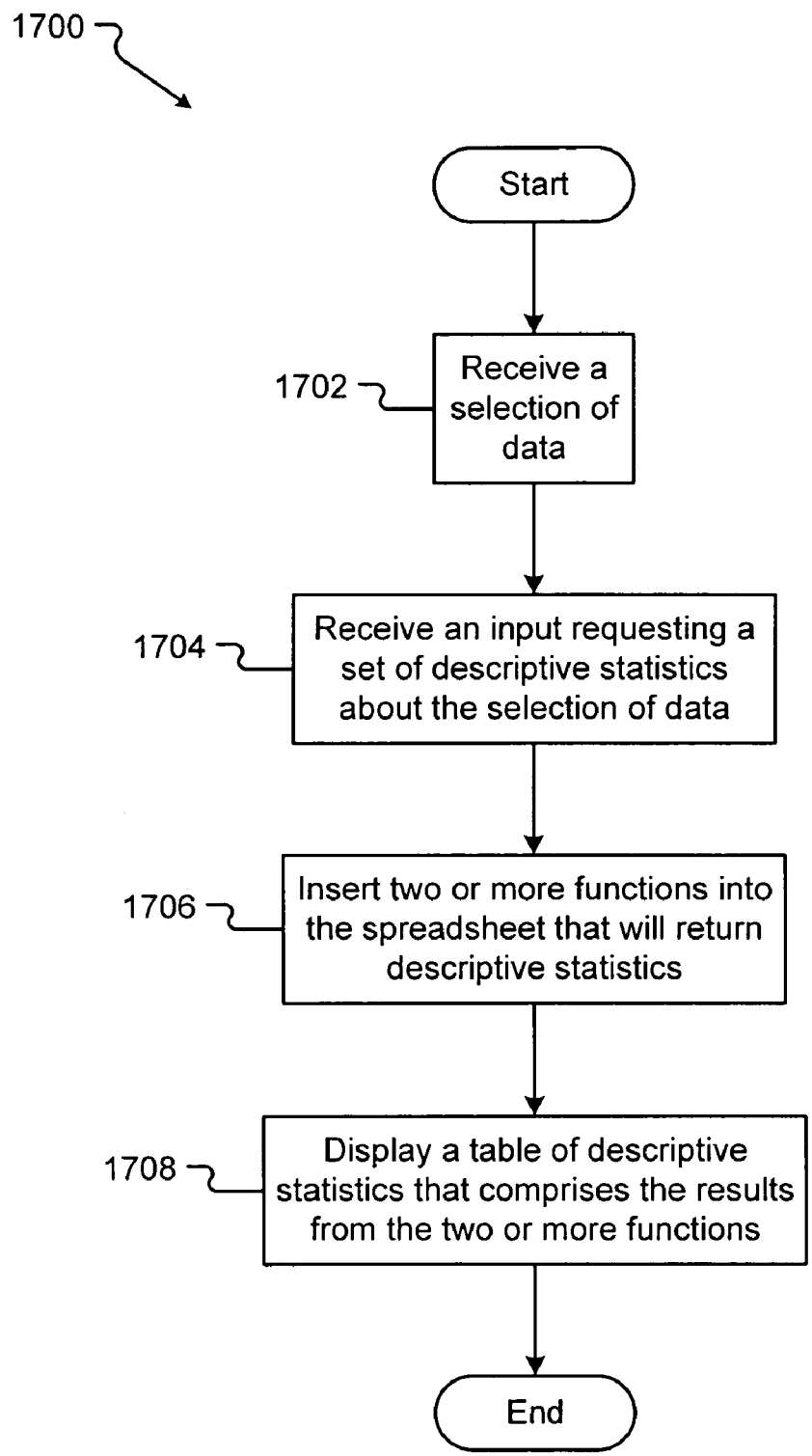
FIG. 17 is a flow chart of function steps according to an embodiment of a method for automatically generating a set of descriptive statistics with a task helper according to the present invention.

An exemplary method 1700 for inserting a set of descriptive statistics, such as descriptive statistics 1208, into a spreadsheet is shown in FIG. 17. A receive operation 1702 receives a selection of data from a user. In one embodiment, a user inputs the selection of data into a user entry area, such as user entry area 1204, in a dialog, such as dialog 1202, of a task helper. In one embodiment, the task helper selects the data via semi selection, and the user accepts the selection. A receive operation 1704 receives a request for descriptive statistics. In one embodiment, the user selects the task helper for descriptive statistics. In another embodiment, the user selects a certain set of descriptive statistics from a selection in a task helper dialog.

An insert operation 1706 inserts two or more functions into the spreadsheet. The two or more functions return a result that provides the descriptive statistics. A display operation 1708 displays the result of the functions in the spreadsheet. In one embodiment, the descriptive statistics are organized in a table, such as table 1210, having a list of titles for the descriptive statistics and the results of the functions in an adjacent cell.

Figure 18:
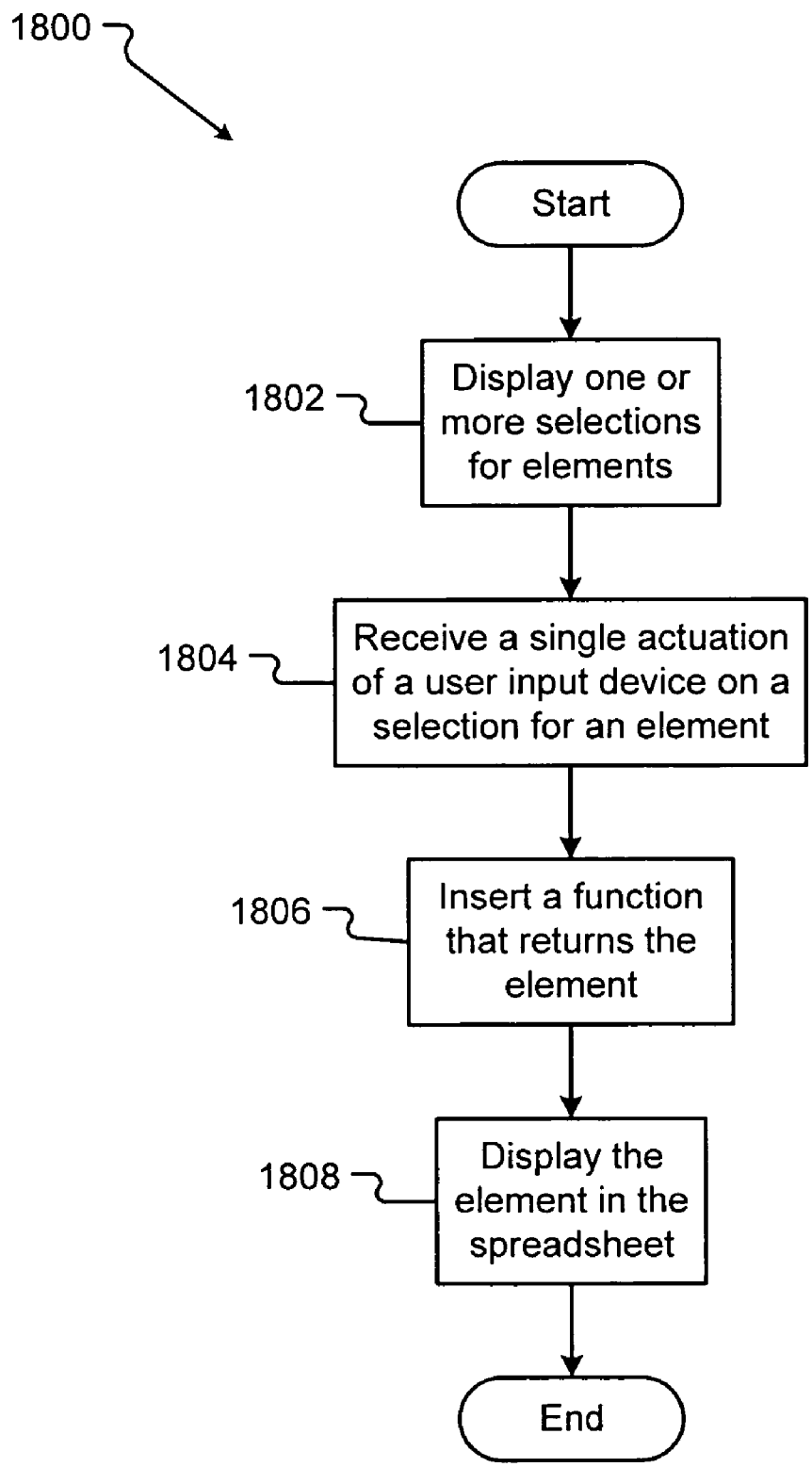
FIG. 18 is a flow chart of function steps according to an embodiment of a method for automatically generating an element with a one-click task helper according to the present invention.
Figure 19A:
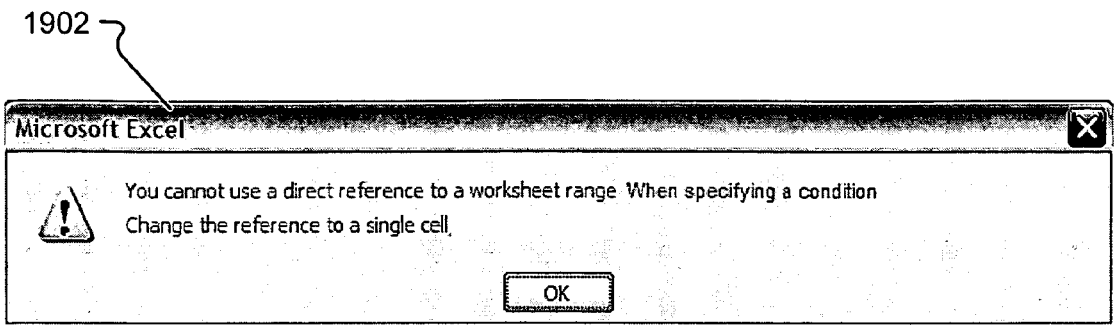
FIG. 19 provides exemplary embodiments of prompts warning the user before completing the task helper that one or more of the input parameters are invalid for the type of task according to the present invention.
Figure 19B:
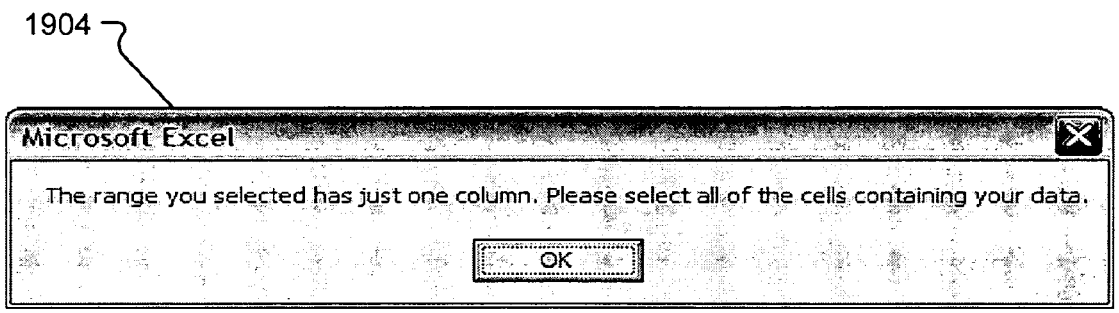
Figure 19C:
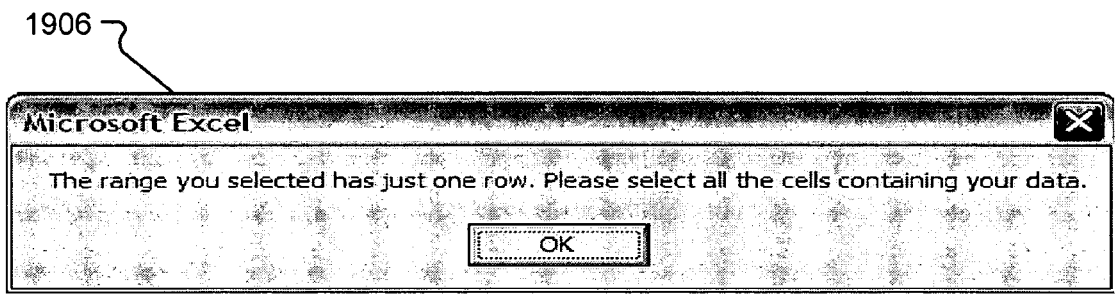
Figure 19D:
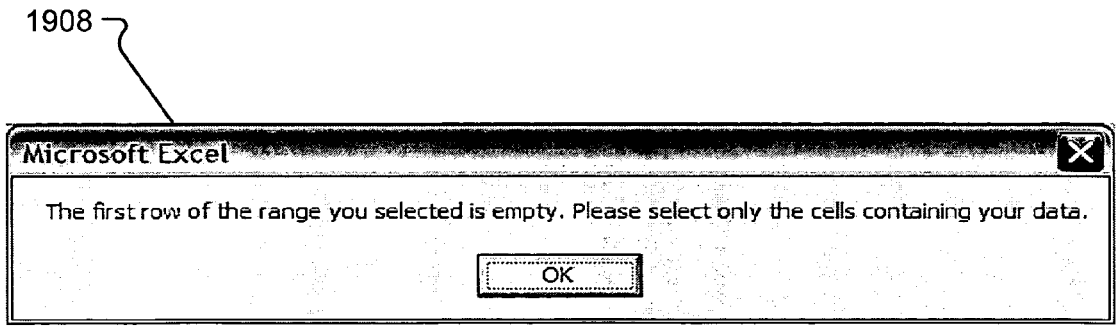
Figure 19E:
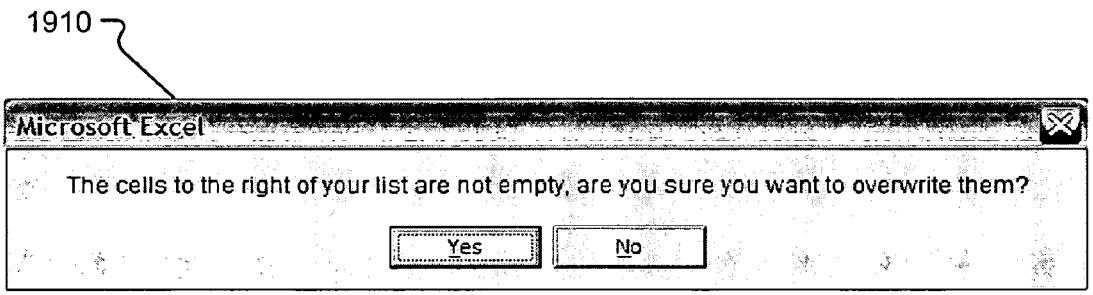
Figure 19F:
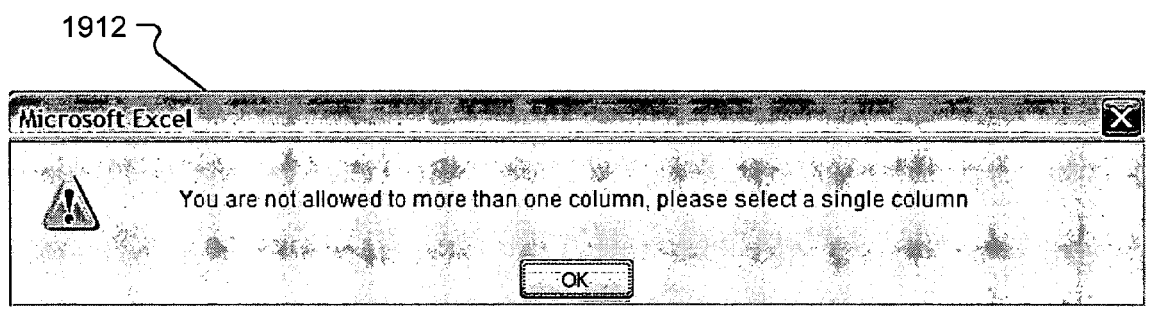
Figure 19G:
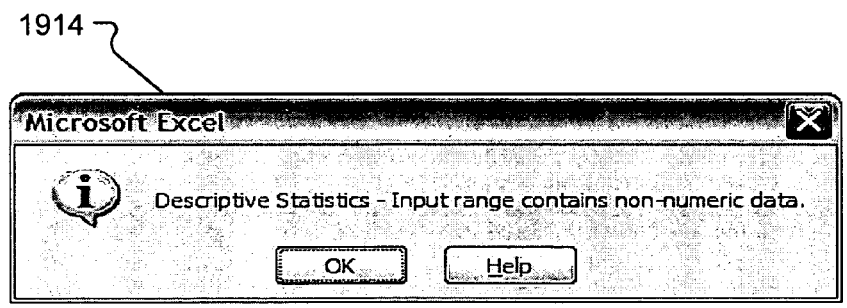

A method 1800 for inserting an element into a spreadsheet is shown in FIG. 18. A display operation 1802 displays the selection of one or more element task helpers. In one embodiment, the element task helpers are menu items, such as menu item 1106, in a menu, such as menu 1104. A user places a mouse cursor over the menu selection or places a focus on the menu selection using a user input device. A receive operation 1804 receives a selection of the element task helper. The selection is a single actuation of the user input device, such as a single click of a mouse button. An insert operation 1806 inserts a function into the active cell. The function returns the element. Display operation 1808 displays the result of the function. The actual element is displayed in the active cell. Thus, the user only needs to make a single mouse click to insert the element.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. In a computer system having a graphical user interface including a display device and one or more user interface selection devices, a method for manipulating data in a data application, comprising:
    displaying one or more task helpers and associated descriptions on the display device, wherein the task helpers correspond to data manipulation tasks, and wherein the task helpers and associated descriptions are displayed in plain non-mathematical language;
    receiving from a user a selection of a task helper;
    receiving from the user a selection of data;
    scanning the selection of data for data headers, wherein once data headers are located saving the data headers and arranging the data headers in a list;
    displaying one or more sequential dialog windows comprising plain non-mathematical language prompts and related user entry areas, wherein the plain non-mathematical language prompts enable a user to customize the data manipulation task without knowledge of formula syntax or abbreviated formula titles, and wherein the one or more sequential dialog windows include navigation buttons that are active or inactive depending on a status of the one or more sequential dialog windows, wherein the navigation buttons are initially inactive;
    in response to the plain non-mathematical language prompts, receiving one or more parameters from a user selection device into the related user entry areas, wherein the one or more parameters define the data manipulation task, and wherein the one or more parameters can be selected from the list of data headers;
    determining whether the one or more parameters contain non-recognizable characters;
    if the one or more parameters contain non-recognizable characters, generating a pop up window telling the user that the one or more parameters contain non-recognizable characters;
    determining the status of the one or more sequential dialog windows;
    based upon the determination of the status, activating the navigation button to receive a selection to proceed;
    automatically generating a formula according to the parameters received in the related user entry areas;
    applying the formula to the selection of data; and
    displaying a result, thereby completing the data manipulation task associated with the selected task helper.

2. The method of claim 1, wherein the parameters received in the related user entry areas are a discrete parameter.

3. The method of claim 1, further comprising presenting a warning prompt when a parameter is not valid after inputting of one of the parameters but before displaying an additional sequential dialog window.

4. The method of to claim 1, further comprising receiving a location in the data application to place the result of the task helper.

5. The method of claim 1, further comprising:
displaying a toolbar with at least one user selectable device representing at least one category of task helpers;
receiving a selection of a category of task helper;
in response to the selection of a category of task helper, displaying a menu having at least one selection of task helper.

6. The method of claim 1, wherein the category of task helper comprises at least one of: logical task helpers, textual task helpers, date and time task helpers, and financial task helpers.

7. A method of claim 1, wherein the user selectable device representing the category of task helper is presented in a help menu.

8. A method of claim 1, further comprising:
receiving focus on a cell having a result created from a task helper; and
displaying an object near to the cell indicating that the result in the cell was created with a task helper.

9. A method of claim 8, further comprising:
receiving a selection of the object; and
displaying a user interface for the task helper that created the data in the cell.

10. A method for creating a formula to complete a task in a data application, wherein the task involves data manipulation, the method comprising:
providing one or more task helpers and associated descriptions, wherein the one or more task helpers and associated descriptions are displayed in plain non-mathematical language, and wherein the plain language enables a user to select a task helper without knowledge of formula syntax or abbreviated formula titles;
accepting a selection by a user of a task helper, wherein the selected task helper corresponds to a desired data manipulation task;
scanning the selection for data headers, wherein once data headers are located saving the data headers and arranging the data headers in a list;
displaying one or more sequential dialog windows comprising plain non-mathematical language prompts and related user entry areas, wherein the plain non-mathematical language prompts enable a user to customize the data manipulation task without knowledge of formula syntax or abbreviated formula titles, and wherein the one or more sequential dialog windows include navigation buttons that are active or inactive depending on a status of the one or more sequential dialog windows, wherein the navigation buttons are initially inactive;
in response to the plain non-mathematical language prompts, receiving one or more parameters from a user selection device into the related user entry areas, wherein the one or more parameters define the data manipulation task, and wherein the one or more parameters can be selected from the list of data headers;
determining whether the one or more parameters contain non-recognizable characters;
if the one or more parameters contain non-recognizable characters, generating a pop up window telling the user that the one or more parameters contain non-recognizable characters;
upon receiving the one or more parameters, determining the status of the one or more sequential dialog windows;
based upon the determination of the status, activating the navigation button to receive a selection to proceed;
automatically selecting one or more functions to use in generating a result based on the selected task helper;
automatically generating the result that comprises the one or more functions; and
displaying the result in the data application, thereby completing the desired data manipulation task.

11. The method of claim 10, wherein the one or more functions create a formula to generate the result.

12. The method of claim 11, wherein the formula comprises two or more functions.

13. The method of claim 10, further comprising:
receiving an input to create the set of descriptive statistics about the selection of data; and
displaying the set of descriptive statistics arranged in a tabular display in the data application, wherein the set of descriptive statistics are the results from the two or more functions.

14. The method of claim 13, wherein the set of descriptive statistics comprise the results from at least one of: a mean, a mode, a range, a standard deviation, a maximum, a minimum, a sum, a standard error, a sample variance, a skewness, a Kurtosis, a sum, and a count.

15. A computer-readable medium having computer-executable instructions for performing a method of creating a formula to complete a desired task , wherein the desired task involves data manipulation, the computer storage medium comprising:
computer executable instructions that when executed provide one or more task helpers and associated descriptions, wherein the one or more task helpers and associated descriptions are displayed in plain non-mathematical language, and wherein the plain non-mathematical language enables a user to select a task helper without knowledge of formula syntax or abbreviated formula titles;
computer executable instructions that when executed accept a selection of a task helper from a user, wherein the selected task helper corresponds to the desired data-manipulation task;
computer executable instructions that when executed scan the selection for data headers, wherein once data headers are located saving the data headers and arranging the data headers in a list;
computer executable instructions that when executed display one or more sequential dialog windows comprising plain non-mathematical language prompts and related user entry areas, wherein the plain non-mathematical language prompts enable a user to customize the data manipulation task without knowledge of formula syntax or abbreviated formula titles, and wherein the one or more sequential dialog windows include navigation buttons that are active or inactive depending on a status of the one or more sequential dialog windows, wherein the navigation buttons are initially inactive;
computer executable instructions that when executed, in response to the plain non-mathematical language prompts, receive one or more parameters from a user selection device into the related user entry areas, wherein the one or more parameters define the data manipulation task, and wherein the one or more parameters can be selected from the list of data headers;
computer executable instructions that when executed determine whether the one or more parameters contain non-recognizable characters;
computer executable instructions that when executed generating a pop up window telling the user that the one or more parameters contain non-recognizable characters, if the one or more parameters contain non-recognizable characters;

computer executable instructions that when executed determine the status of the one or more sequential dialog windows upon receiving the one or more parameters;

computer executable instructions that when executed activate the navigation button to receive a selection to proceed based upon the determination of the status;

computer executable instructions that when executed automatically select one or more functions to use in generating a formula based on the selected task helper;

computer executable instructions that when executed automatically generate the formula that comprises the one or more functions;

computer executable instructions that when executed store the formula on the computer storage medium; and computer executable instructions that when executed display a result of the formula in the data application to complete the desired data-manipulation task.

16. The computer storage medium of claim 15, the computer storage medium further comprising:

computer executable instructions that when executed receive an input to create a set of descriptive statistics about the selection of data; and computer executable instructions that when executed display the set of descriptive statistics arranged in a tabular display in the data application, wherein the set of descriptive statistics are the results of the formula generated from the one or more functions.

17. The method of claim 1, wherein the data application comprises a data spreadsheet.

* * * * *

UNITED STATES PATENT AND TRADEMARK OFFICE
CERTIFICATE OF CORRECTION

PATENT NO. : 7,634,730 B2
APPLICATION NO. : 11/014013
DATED : December 15, 2009
INVENTOR(S) : Brandon G. Weber et al.

It is certified that error appears in the above-identified patent and that said Letters Patent is hereby corrected as shown below:

In column 19, line 15, in Claim 7, delete "A" and insert -- The --, therefor.

In column 19, line 18, in Claim 8, delete "A" and insert -- The --, therefor.

In column 19, line 23, in Claim 9, delete "A" and insert -- The --, therefor.

In column 19, line 26, in Claim 9, delete "data" and insert -- result --, therefor.

In column 20, line 12, in Claim 13, delete "the" and insert -- a --, therefor.

Signed and Sealed this
Twenty-second Day of May, 2012

David J. Kappos
*Director of the United States Patent and Trademark Office*